US012353525B1

(12) United States Patent
Malassenet et al.

(10) Patent No.: US 12,353,525 B1
(45) Date of Patent: *Jul. 8, 2025

(54) METHODS, SYSTEMS, AND DEVICES FOR AN ENCRYPTED AND OBFUSCATED ALGORITHM IN A COMPUTING ENVIRONMENT

(71) Applicant: GSFM LLC, Raleigh, NC (US)

(72) Inventors: Francois Jacques Malassenet, Raleigh, NC (US); Glenn Daniel Sidle, Raleigh, NC (US)

(73) Assignee: GSFM LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,379

(22) Filed: Apr. 24, 2024

Related U.S. Application Data

(63) Continuation of application No. 17/706,661, filed on Mar. 29, 2022, now Pat. No. 12,001,525, which is a
(Continued)

(51) Int. Cl.
*G06F 21/14* (2013.01)
*G06F 9/30* (2018.01)
*G06F 21/52* (2013.01)
*G06F 21/75* (2013.01)
*H04L 9/00* (2022.01)

(52) U.S. Cl.
CPC .......... *G06F 21/14* (2013.01); *G06F 9/30036* (2013.01); *G06F 21/52* (2013.01); *G06F 21/75* (2013.01); *H04L 9/002* (2013.01); *H04L 2209/16* (2013.01)

(58) Field of Classification Search
CPC ...... G06F 21/14; G06F 9/30036; G06F 21/52; G06F 21/75; H04L 9/002
See application file for complete search history.

(56) References Cited

U.S. PATENT DOCUMENTS 6,480,959 B1 * 11/2002 Granger .................. G06F 21/14
726/32
7,054,444 B1    5/2006 Paillier
(Continued)

OTHER PUBLICATIONS

Barak, Boaz, et al., On the (Im)possibility of Obfuscating Programs, Journal of the ACM, Jan. 2012, pp. A:1-A-49, vol. 59, No. 2.
(Continued)

*Primary Examiner* — Jason Chiang
(74) *Attorney, Agent, or Firm* — NK Patent Law

(57) ABSTRACT

A computer implemented method is disclosed for obfuscating an algorithm. The computer-implemented method includes (1) receiving ciphertext input data, and (2) executing obfuscated program instructions using the ciphertext input data and an obfuscation key. The ciphertext input data is based on plaintext input data encrypted using an input encryption key. The obfuscated program instructions are configured for concealing initial program instructions. The initial program instructions are configured for (1) receiving the plaintext input data, (2) providing plaintext output data based on an algorithm, and (3) providing ciphertext output data. The ciphertext output data is configured for decryption to provide the plaintext output data.

17 Claims, 17 Drawing Sheets

Related U.S. Application Data continuation of application No. 16/400,147, filed on May 1, 2019, now Pat. No. 11,301,547, which is a continuation of application No. 16/003,152, filed on Jun. 8, 2018, now Pat. No. 10,289,816.

(56) References Cited

U.S. PATENT DOCUMENTS

| | | | | |
|---|---|---|---|---|
| 7,263,722 | B1* | 8/2007 | Luo | G06F 21/125 713/193 |
| 7,841,009 | B1* | 11/2010 | Smith | G06F 21/14 726/22 |
| 7,856,100 | B2 | 12/2010 | Wang et al. | |
| 7,869,598 | B2 | 1/2011 | Kerschbaum | |
| 7,877,410 | B2 | 1/2011 | Staddon et al. | |
| 7,996,671 | B2* | 8/2011 | Chheda | G06F 21/125 712/213 |
| 8,019,705 | B2* | 9/2011 | Fiske | G06F 8/41 706/14 |
| 8,565,435 | B2 | 10/2013 | Gentry et al. | |
| 8,630,422 | B2 | 1/2014 | Gentry et al. | |
| 8,681,973 | B2 | 3/2014 | Weinman | |
| 8,806,187 | B1* | 8/2014 | Vemula | H04L 67/306 713/150 |
| 8,909,957 | B2 | 12/2014 | Kolvick et al. | |
| 8,909,967 | B1* | 12/2014 | van Dijk | G09C 1/00 713/153 |
| 9,055,038 | B1 | 6/2015 | Lu et al. | |
| 9,900,147 | B2 | 2/2018 | Laine et al. | |
| 9,906,360 | B2* | 2/2018 | Johnson | H04L 9/0631 |
| 9,921,978 | B1* | 3/2018 | Chan | G06F 3/0622 |
| 10,289,816 | B1* | 5/2019 | Malassenet | G06F 21/75 |
| 10,310,896 | B1* | 6/2019 | Kichak | G06F 9/4843 |
| 10,621,365 | B1* | 4/2020 | Powers | H04L 9/0894 |
| 2005/0071664 | A1* | 3/2005 | de Jong | G06F 21/14 726/26 |
| 2008/0126766 | A1* | 5/2008 | Chheda | G06F 9/3879 712/E9.067 |
| 2008/0162949 | A1* | 7/2008 | Sato | G06F 21/14 713/194 |
| 2008/0229115 | A1* | 9/2008 | Wollnik | G06F 21/14 713/190 |
| 2009/0077388 | A1* | 3/2009 | Suzuki | G06F 21/14 713/189 |
| 2009/0228717 | A1* | 9/2009 | Futa | H04L 9/302 713/190 |
| 2010/0115260 | A1* | 5/2010 | Venkatesan | H04L 9/3234 713/150 |
| 2010/0257103 | A1* | 10/2010 | Muller | H04L 51/234 705/80 |
| 2010/0322411 | A1* | 12/2010 | Lubberhuizen | H04L 9/0631 380/28 |
| 2012/0331283 | A1* | 12/2012 | Chandran | H04L 9/088 713/150 |
| 2014/0143172 | A1* | 5/2014 | Richter | G06Q 30/00 705/342 |
| 2014/0181115 | A1* | 6/2014 | Chen | G06F 16/2228 707/741 |
| 2014/0245012 | A1* | 8/2014 | Arya | H04L 63/0464 713/171 |
| 2015/0124962 | A1 | 5/2015 | Gentry et al. | |
| 2015/0172320 | A1* | 6/2015 | Colombo | H04L 63/105 726/1 |
| 2015/0372814 | A1* | 12/2015 | Ali | H04L 9/3234 713/155 |
| 2016/0028698 | A1* | 1/2016 | Antipa | G06F 21/606 713/150 |
| 2016/0218872 | A1* | 7/2016 | Anderson | H04L 9/00 |
| 2017/0054554 | A1* | 2/2017 | Park | H04L 9/088 |
| 2017/0091485 | A1* | 3/2017 | Yuen | H04L 9/002 |
| 2017/0124271 | A1* | 5/2017 | Aase | G16Z 99/00 |
| 2017/0134157 | A1 | 5/2017 | Laine et al. | |
| 2017/0177504 | A1* | 6/2017 | Desai | G06F 12/1408 |
| 2017/0310483 | A1* | 10/2017 | Nagao | G06F 21/44 |
| 2017/0344757 | A1 | 11/2017 | Clarke | |
| 2017/0359321 | A1 | 12/2017 | Rindal et al. | |
| 2017/0366514 | A1* | 12/2017 | Malka | H04L 9/3247 |
| 2018/0062843 | A1* | 3/2018 | Gopal | G06F 7/725 |
| 2018/0173589 | A1* | 6/2018 | Chang | G06F 21/6218 |

OTHER PUBLICATIONS

Barrington, D A., Bounded-Width Polynomial-Size Branching Programs Recognize Exactly Those Languages in NC1, In Proceedings of the Eighteenth Annual ACM Symposium on Theory of Computing, 1986, pp. 1-5, New York, NY, USA.

Boneh, Dan, et al., Public Key Encryption That Allows PIR Queries, Advances in Cryptology—Crypto 2007, 2007, pp. 50-67, LNCS 4622.

Brakerski, Zvikaz, et al., (Leveled) Fully Homomorphic Encryption Without Bootstrapping, ITCS '12 Proceedings of the 3rd Innovations in Theoretical Computer Science Conference, Jan. 8-10, 2012, pp. 309-325, ACM, New York, NY, USA.

Cheon, Jung Hee, et al, Cryptanalysis on the HHSS Obfuscation Arising from Absence of Safeguards, Cryptology ePrint Archive, 2018, 8 Pgs., Report 2018/397.

Chillotti, Ilaria, et al., Improving TFHE: Faster Packed Homomorphic Operations and Efficient Circuit Bootstrapping, Cryptology ePrint Archive, 39 Pgs., Report 2017/430.

Colberg, Christian, et al., A Taxonomy of Obfuscating Transformations, Technical Report #148, 1997, 36 Pgs., Department of Computer Science, The University of Auckland, New Zealand.

Crawford, Jack L. H., et al., Doing Real Work with FHE: The Case of Logistic Regression, Cryptology EPrint Archive, 2018, 29 Pgs., Report 2018/202.

Delerablee, Cecile, et al., White-Box Security Notions for Symmetric Encryption Schemes, Selected Areas in Cryptography—SAC 2013, pp. 247-264, vol. 8282.

Dowlin, Nathan, et al., CryptoNets: Applying Neural Networks to Encrypted Data with High Throughput and Accuracy, In Proceedings of the 33rd International Conference on Machine Learning, 2016, vol. 48, New York, USA.

Dwork, Cynthia, Differential Privacy, 33rd International Colloquium—ICALP 2006, Jul. 10-14, 2006, pp. 1-12, Part II—4052, Venice, Italy.

Garg, Sanjam, et al., Candidate Indistinguishability Obfuscation and Functional Encryption for All Circuits, SIAM Journal on Computing, 2013, pp. 882-929, v. 45 (3).

Garg, Sanjam, et al., Candidate Multilinear Maps from Ideal Lattices, Advances in Cryptology—Eurocrypt 2013, 2013, pp. 1-17, Lecture Notes in Computer Science vol. 7881.

Kocher, Paul, Spectre Attacks: Exploiting Speculative Execution, presented at the RSA Conference, Apr. 16-18, 2018, San Francisco, CA.

Lipp, Moritz, et al., Meltdown, arXiv:1801.01207 [cs.CR], Jan. 3, 2018, 16 Pgs., v1.

Peikert, Chris, A Decade of Lattice Cryptography, Foundations and Trends in Theoretical Computer Science, Mar. 24, 2016, pp. 283-424, vol. 10, No. 4.

Regev, Oded, The Learning with Errors Problem, 2010 IEEE 25th Annual Conference on Computational Complexity, Jun. 9-12, 2010, pp. 191-204.

USPTO, Non-Final Rejection in U.S. Appl. No. 16/003,152 dated Sep. 5, 2018, pp. 1-19.

USPTO, Final Rejection in U.S. Appl. No. 16/003,152 dated Jan. 15, 2019, pp. 1-21.

USPTO, Non-Final Rejection in U.S. Appl. No. 16/400,147 dated Nov. 23, 2020, pp. 1-21.

USPTO, Non-Final Rejection in U.S. Appl. No. 17/706,661 dated Sep. 28, 2023, pp. 1-11.

* cited by examiner

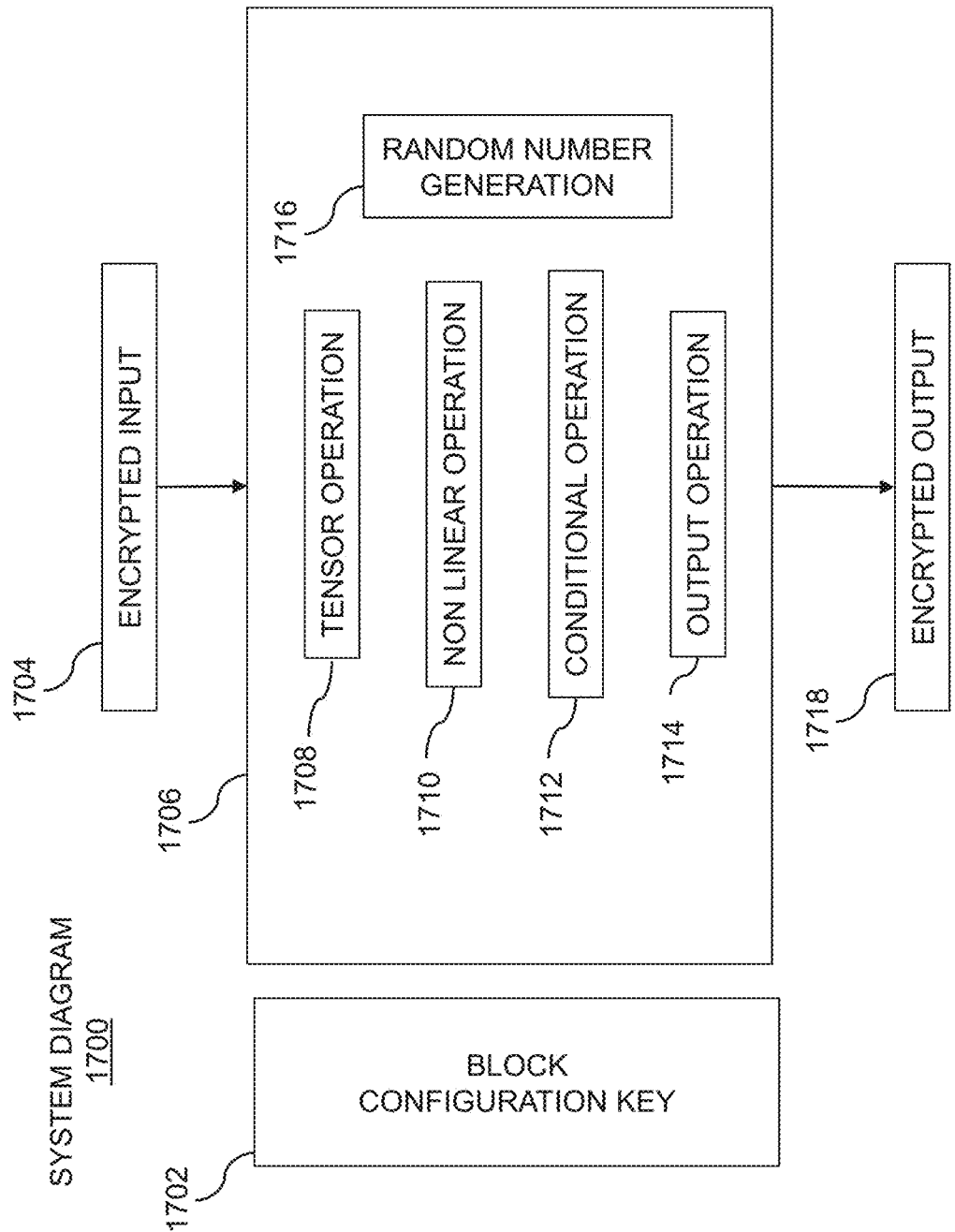

METHODS, SYSTEMS, AND DEVICES FOR AN ENCRYPTED AND OBFUSCATED ALGORITHM IN A COMPUTING ENVIRONMENT

CROSS REFERENCE TO RELATED APPLICATION

This application is a continuation of U.S. patent application Ser. No. 17/706,661 entitled "METHODS, SYSTEMS, AND DEVICES FOR AN ENCRYPTED AND OBFUSCATED ALGORITHM IN A COMPUTING ENVIRONMENT", filed on Mar. 29, 2022, which is a continuation of U.S. patent application Ser. No. 16/400,147 entitled "METHODS, SYSTEMS, AND DEVICES FOR AN ENCRYPTED AND OBFUSCATED ALGORITHM IN A COMPUTING ENVIRONMENT", filed on May 1, 2019, now U.S. Pat. No. 11,301,547 issued on Apr. 12, 2022, which is a continuation of U.S. patent application Ser. No. 16/003,152 entitled "METHODS, SYSTEMS, AND DEVICES FOR AN ENCRYPTED AND ALGORITHM OBFUSCATED IN A COMPUTING ENVIRONMENT", filed on Jun. 8, 2018, now U.S. Pat. No. 10,289,816 issued on May 14, 2019, the contents of all of which are incorporated by reference herein in their entireties.

TECHNICAL FIELD

The present disclosure relates to encryption and cryptography. More specifically, the disclosure applies to systems and methods used to obfuscate and encrypt data, programs, and algorithms.

BACKGROUND

An encrypted obfuscation scheme has six components: (1) a key generation algorithm, (2) a data encryption algorithm, (3) a data decryption algorithm, (4) an obfuscation algorithm, (5) a deobfuscation algorithm, and (6) a verification algorithm. The key generation algorithm creates a data encryption key, a data decryption key, an obfuscation key and a deobfuscation key. The obfuscation algorithm takes a plaintext algorithm and the obfuscation key as input and generates an obfuscated algorithm. The data encryption algorithm uses a plaintext and an encryption key as input and returns a ciphertext. The obfuscated algorithm takes this ciphertext as input and generates an output ciphertext. The decryption algorithm takes an output ciphertext and the decryption key and returns a plaintext. The obfuscation system is consistent if the plaintext is identical to the output of the original algorithm. The verification algorithm provides a confirmation that the system is consistent and the keys are correctly generated from the operation. For a fully end-to-end obfuscation configuration, the deobfuscation algorithm and deobfuscation key may not be generated. In a symmetric encrypted obfuscation scheme, the data encryption and decryption keys may be identical and the obfuscation and deobfuscation keys may also be identical. In an asymmetric scheme, also known as public key scheme system, the encryption and decryption keys may be different and the obfuscation and deobfuscation keys may also be different. In general, the decryption algorithm and decryption key operate on the output obfuscated algorithm (i.e., encrypted input data may not be converted into plaintext directly). The verification algorithm may be based on the generation of authentication tokens from a trusted party, or can be based on periodic polling.

An encryption obfuscation update scheme has three components, an update key generation algorithm, an obfuscation update algorithm, and a distribution algorithm. The update key generation algorithm creates data encryption update key, data decryption update key, obfuscation update key and deobfuscation update key. The obfuscation update algorithm uses an encrypted obfuscated algorithm as input and creates a new encrypted obfuscated algorithm. The key distribution algorithm takes an encryption key, a decryption key, an encryption update key, and a decryption update key as input and returns a new encryption key and a new decryption key.

While these types of traditional obfuscation convert programs into an unintelligible form, they still release the output of the program in the clear as the decryption of the data is performed first and then obfuscated algorithm operates on plaintext. The resulting plaintext output must be encrypted final output. Accordingly, a need exists for new methods, systems, and devices for encrypted obfuscation wherein an adversary is prevented from retrieving any information related to the inputs, outputs and/or types of computation.

SUMMARY

Disclosed herein are methods, systems, and devices for obfuscating an algorithm. According to one embodiment, a computer implemented method includes (1) receiving ciphertext input data, and (2) executing obfuscated program instructions using the ciphertext input data and an obfuscation key. The ciphertext input data is based on plaintext input data encrypted using an input encryption key. The obfuscated program instructions are configured for concealing initial program instructions. The initial program instructions are configured for (1) receiving the plaintext input data, (2) providing plaintext output data based on an algorithm, and (3) providing ciphertext output data. The ciphertext output data is configured for decryption to provide the plaintext output data.

The computer-implemented method may be performed by a server, a personal computer, a workstation, a laptop, a tablet, a smartphone, a smart watch, an Internet-of-Things device or the like. The Internet-of-Things device may be a monitoring device, an autonomous vehicle, a home assistant, a smart appliance, a medical device, a virtual reality device, an augmented reality device, or the like. The server may be a hardware server, a virtual server, and/or a virtual container. The server may form at least a portion of a cloud-computing environment and/or a portion of an enterprise computing environment. In other embodiments, the server is an edge server.

In some embodiments, the obfuscated program instructions may be configured for providing the ciphertext output data without decrypting the ciphertext input data. The obfuscated program instructions may be further configured for providing the ciphertext output data without directly encrypting the plaintext output data. The obfuscated program instructions may be single instruction, multiple data (SIMD) block converted program instructions using the initial program instructions, and the SIMD block converted program instructions may be configured to perform a linear operation, a nonlinear operation, a data augmentation operation, an output operation, or the like. In certain embodiments, the data augmentation operation may include insertion of random numbers. The SIMD block converted program instructions may also be configured with a least a portion of the obfuscation key. The obfuscation key may include the input encryption key, an output decryption key, an input decryption key, a de-obfuscation key, or the like. In certain embodiments, the obfuscation key may be deactivated based on a deactivation policy. The deactivation policy may disable the obfuscation key based on an erroneous authentication; an expiration date; an expiration time; a number of activations, or the like.

In some embodiments, the initial program instructions may be performed on a linear space, a cyclic group, a polynomial ring, a polynomial ring of over a finite field, a polynomial, a modulo, or the like. The initial program instructions may also be plaintext program instructions and/or compiled binary program instructions. The algorithm may be a machine learning algorithm, a database query algorithm, an algorithm that creates virtual servers, an algorithm that implements prefetch instructions, a block chain based contract, a direct acyclic graph algorithm, a support vector machine algorithm, a quantum computer program, an algorithm that can be parallelized on multiple processors, or the like.

In some embodiments, the encryption key may be transmitted to a first client device and the ciphertext input data may be received from the first client device. The first client device may be a personal computer, a workstation, a laptop, a tablet, a smartphone, a smart watch, an Internet-of-Things device, or the like. The ciphertext input data may also be encrypted using a public/private key exchange system. The ciphertext output data may be transmitted to the first client device and/or to a second client device. The second client device may also be a personal computer, a workstation, a laptop, a tablet, a smartphone, a smart watch, an Internet-of-Things device, or the like. In other embodiments, the ciphertext input data may be received from a first server and the ciphertext output data may be transmitted to the first server. In other embodiments, the ciphertext output data may be transmitted to a second server.

In some embodiments, the ciphertext input data may be received over a personal area network (PAN), a local area network (LAN), a wide area network (WAN), and/or a computer interface. The computer interface may be an Advanced Technology Attachment (ATA) interface, a serial ATA (SATA) interface, a small computer system interface (SCSI) interface, a secure digital (SD) interface, a serial peripheral interface (SPI), a multimedia card (MMC) interface, a universal serial bus (USB) interface, or the like.

In another embodiment, a computing device includes a memory and at least one processor configured to perform a method for obfuscating an algorithm. The method includes (1) receiving ciphertext input data, and (2) executing obfuscated program instructions using the ciphertext input data and an obfuscation key. The ciphertext input data is based on plaintext input data encrypted using an input encryption key. The obfuscated program instructions are configured for concealing initial program instructions. The initial program instructions are configured for (1) receiving the plaintext input data, (2) providing plaintext output data based on an algorithm, and (3) providing ciphertext output data. The ciphertext output data is configured for decryption to provide the plaintext output data.

In another embodiment, a non-transitory computer-readable storage medium stores computer instructions to be implemented on at least one computing device that includes at least one processor, the computer instructions when executed by the at least one processor cause the at least one computing device to perform a method for obfuscating an algorithm. The method includes (1) receiving ciphertext input data, and (2) executing obfuscated program instructions using the ciphertext input data and an obfuscation key. The ciphertext input data is based on plaintext input data encrypted using an input encryption key. The obfuscated program instructions are configured for concealing initial program instructions. The initial program instructions are configured for (1) receiving the plaintext input data, (2) providing plaintext output data based on an algorithm, and (3) providing ciphertext output data. The ciphertext output data is configured for decryption to provide the plaintext output data.

In another embodiment, a computer implemented method for obfuscating an algorithm includes receiving ciphertext input data and executing obfuscated program instructions using the ciphertext input data, and at least one of a first obfuscation key and a second obfuscation key. The ciphertext input data is based on plaintext input data encrypted using an input encryption and the obfuscated program instructions are configured for concealing initial program instructions. The initial program instructions are configured for (1) receiving the plaintext input data, (2) providing first plaintext output data based on an algorithm, and (3) providing second plaintext output data based on the algorithm. The second plaintext output data is of a lower resolution that the first plaintext output data. When executing the obfuscated program instructions using the first obfuscation key, the method provides the first ciphertext output data. The first ciphertext output data is configured for decryption to provide the first plaintext output data. When executing the obfuscated program instructions using the second obfuscation key, the method provides the second ciphertext output data. The second ciphertext output data is configured for decryption to provide the second plaintext output data.

In another embodiment, a computing device includes a memory and at least one processor configured to perform a method for obfuscating an algorithm. The method includes receiving ciphertext input data and executing obfuscated program instructions using the ciphertext input data, and at least one of a first obfuscation key and a second obfuscation key. The ciphertext input data is based on plaintext input data encrypted using an input encryption and the obfuscated program instructions are configured for concealing initial program instructions. The initial program instructions are configured for (1) receiving the plaintext input data, (2) providing first plaintext output data based on an algorithm, and (3) providing second plaintext output data based on the algorithm. The second plaintext output data is of a lower resolution that the first plaintext output data. When executing the obfuscated program instructions using the first obfuscation key, the method provides the first ciphertext output data. The first ciphertext output data is configured for decryption to provide the first plaintext output data. When executing the obfuscated program instructions using the second obfuscation key, the method provides the second ciphertext output data. The second ciphertext output data is configured for decryption to provide the second plaintext output data.

In another embodiment, a non-transitory computer-readable storage medium stores computer instructions to be implemented on at least one computing device that includes at least one processor, the computer instructions when executed by the at least one processor cause the at least one computing device to perform a method for obfuscating an algorithm. The method includes receiving ciphertext input data and executing obfuscated program instructions using the ciphertext input data, and at least one of a first obfuscation key and a second obfuscation key. The ciphertext input data is based on plaintext input data encrypted using an input encryption and the obfuscated program instructions are configured for concealing initial program instructions. The initial program instructions are configured for (1) receiving the plaintext input data, (2) providing first plaintext output data based on an algorithm, and (3) providing second plaintext output data based on the algorithm. The second plaintext output data is of a lower resolution that the first plaintext output data. When executing the obfuscated program instructions using the first obfuscation key, the method provides the first ciphertext output data. The first ciphertext output data is configured for decryption to provide the first plaintext output data. When executing the obfuscated program instructions using the second obfuscation key, the method provides the second ciphertext output data. The second ciphertext output data is configured for decryption to provide the second plaintext output data.

In another embodiment, a computer implemented method for obfuscating an algorithm includes receiving first program instructions. The first program instructions are configured for receiving plaintext input data and providing plaintext output data based on the algorithm and the plaintext input data. The method further includes (1) determining an input encryption key and an obfuscation key and (2) determining second program instructions based on the first program instructions and the obfuscation key. The second program instructions are configured for (1) receiving ciphertext input data based on the plaintext input data and the input encryption key; and (2) providing ciphertext output data based on the algorithm and the ciphertext input data. The ciphertext output data is an encrypted version of the plaintext output data. The method also stores the second program instructions, the input encryption key, and the obfuscation key.

In some embodiments, the plaintext input data may include real number data, analog data, quantum bits, complex number data, vector-based data, tensor-based data, matrix-based data or the like. The algorithm may be a machine learning algorithm, a database query algorithm, a crypto-currency based contract, an algorithm that creates virtual servers, and an algorithm that implements prefetch instructions, or the like. The machine learning algorithm may be a random forest algorithm, an artificial neural network algorithm, a gradient boosting algorithm, a support vector machine algorithm, a graph based algorithm, a directed acyclic graph algorithm, or the like.

In some embodiments, the second program instructions are further configured for providing the ciphertext output data without decrypting the ciphertext input data. The method may further include further transmitting the second program instructions using a public/private key exchange system to a first server configured to execute the second program instructions. The method may also further include transmitting the input encryption key to a first client computing device. The client computing device may be configured for encrypting the plaintext input data using the input encryption key to provide the ciphertext input data and transmitting the ciphertext input data to the first server for processing by the second program instructions. The first client computing device may be further configured for receiving the ciphertext output data from the first server and decrypting the ciphertext output data to provide the plaintext output data.

In some embodiments, the method may further include determining an output decryption key and transmitting the output decryption key to a second client computing device. The second client computing device may be configured for receiving the ciphertext output data from the first server and decrypting the ciphertext output data using the output decryption key to provide the plaintext output data. In other embodiments, the method may further include transmitting the input encryption key to a second server. The second server may be configured for (1) encrypting the plaintext input data using the input encryption key to provide the ciphertext input data and (2) transmitting the ciphertext input data to the first server for processing by the second program instructions.

In some embodiments, the method may further include receiving a plurality of coefficients associated with the algorithm. The second program instructions maybe determined based on the plurality of coefficients. Determining the second program instructions may also include, (1) processing the first program instructions and the plurality of coefficients using a single instruction multiple data (SIMD) block converter to provide obfuscated program instructions; and (2) processing the obfuscated program instructions using a blockwise encryptor to provide the second program instructions.

In another embodiment, a computing device includes a memory and at least one processor are configured to perform a method for obfuscating an algorithm. The method includes receiving first program instructions. The first program instructions are configured for receiving plaintext input data and providing plaintext output data based on the algorithm and the plaintext input data. The method further includes (1) determining an input encryption key and an obfuscation key and (2) determining second program instructions based on the first program instructions and the obfuscation key. The second program instructions are configured for (1) receiving ciphertext input data based on the plaintext input data and the input encryption key; and (2) providing ciphertext output data based on the algorithm and the ciphertext input data. The ciphertext output data is an encrypted version of the plaintext output data. The method also stores the second program instructions, the input encryption key, and the obfuscation key.

In another embodiment, a non-transitory computer-readable storage medium stores computer instructions to be implemented on at least one computing device that includes at least one processor, the computer instructions when executed by the at least one processor cause the at least one computing device to perform a method for obfuscating an algorithm. The method includes receiving first program instructions. The first program instructions are configured for receiving plaintext input data and providing plaintext output data based on the algorithm and the plaintext input data. The method further includes (1) determining an input encryption key and an obfuscation key and (2) determining second program instructions based on the first program instructions and the obfuscation key. The second program instructions are configured for (1) receiving ciphertext input data based on the plaintext input data and the input encryption key; and (2) providing ciphertext output data based on the algorithm and the ciphertext input data. The ciphertext output data is an encrypted version of the plaintext output data. The method also stores the second program instructions, the input encryption key, and the obfuscation key.

In another embodiment, a computer implemented method for obfuscating an algorithm includes receiving first program instructions. The first program instructions are configured for receiving ciphertext input data and providing ciphertext output data based on the algorithm and the ciphertext input data. The method also includes receiving a first encryption key and a first decryption key. The first encryption key is configured to encrypt the ciphertext input data for the first program instructions. The first decryption key is configured to decrypt the ciphertext output data of the first program instructions. The method also includes (1) receiving a first obfuscation key to generate the first program instructions from plaintext program instructions; (2) determining a second input encryption key, a second output decryption key and a second obfuscation key; and (3) determining second program instructions based on the first program instructions and the second obfuscation key. The second program instructions are configured for (1) receiving ciphertext input data based on the second input encryption key, and (2) providing ciphertext output data based on the algorithm and the ciphertext input data. The ciphertext output data is an encrypted version of the plaintext output data. The method also includes storing the second program instructions, the second input encryption key, the second output decryption key, and the second obfuscation key.

In another embodiment, a computing device includes a memory and at least one processor are configured to perform a method for obfuscating an algorithm. The method includes receiving ciphertext input data and providing ciphertext output data based on the algorithm and the ciphertext input data. The method also includes receiving a first encryption key and a first decryption key. The first encryption key is configured to encrypt the ciphertext input data for the first program instructions. The first decryption key is configured to decrypt the ciphertext output data of the first program instructions. The method also includes (1) receiving a first obfuscation key to generate the first program instructions from plaintext program instructions; (2) determining a second input encryption key, a second output decryption key and a second obfuscation key; and (3) determining second program instructions based on the first program instructions and the second obfuscation key. The second program instructions are configured for (1) receiving ciphertext input data based on the second input encryption key, and (2) providing ciphertext output data based on the algorithm and the ciphertext input data. The ciphertext output data is an encrypted version of the plaintext output data. The method also includes storing the second program instructions, the second input encryption key, the second output decryption key, and the second obfuscation key.

In another embodiment, a non-transitory computer-readable storage medium stores computer instructions to be implemented on at least one computing device that includes at least one processor, the computer instructions when executed by the at least one processor cause the at least one computing device to perform a method for obfuscating an algorithm. The method includes receiving ciphertext input data and providing ciphertext output data based on the algorithm and the ciphertext input data. The method also includes receiving a first encryption key and a first decryption key. The first encryption key is configured to encrypt the ciphertext input data for the first program instructions. The first decryption key is configured to decrypt the ciphertext output data of the first program instructions. The method also includes (1) receiving a first obfuscation key to generate the first program instructions from plaintext program instructions; (2) determining a second input encryption key, a second output decryption key and a second obfuscation key; and (3) determining second program instructions based on the first program instructions and the second obfuscation key. The second program instructions are configured for (1) receiving ciphertext input data based on the second input encryption key, and (2) providing ciphertext output data based on the algorithm and the ciphertext input data. The ciphertext output data is an encrypted version of the plaintext output data. The method also includes storing the second program instructions, the second input encryption key, the second output decryption key, and the second obfuscation key.

In another embodiment, a computer implemented method for obfuscating an algorithm includes receiving first program instructions. The first program instructions are configured for receiving ciphertext input data, and providing ciphertext output data based on the algorithm and the cipher input data. The method further includes (1) receiving a first input encryption key to encrypt the cipher input data for the first program instructions; (2) receiving a first output decryption key to decrypt the cipher output data of the first program instructions; (3) receiving a first obfuscation key to generate the first program instructions from plaintext program instructions; (4) determining a first temporary encryption key; (5) determining a first temporary decryption key; (6) determining a first temporary obfuscation key; (7) determining a second input encryption key; (8) determining a second output decryption key; (9) determining a second obfuscation key based on the first input encryption key, the first output decryption key, the first obfuscation key, the first temporary encryption key, the first temporary decryption key and the first temporary obfuscation key; (10) determining second program instructions based on the first program instructions and the first temporary obfuscation key; and (11) determining third program instructions. The third program instructions are configured for (1) receiving ciphertext input data based on the second input encryption key, and (2) providing ciphertext output data based on the algorithm and the ciphertext input data. The ciphertext output data is an encrypted version of the plaintext output data. The method further includes storing the second program instructions, the second input encryption key, the second output decryption key, the second obfuscation key, the first temporary encryption key, the first temporary decryption key, and the first temporary obfuscation key.

In another embodiment, a computing device includes a memory and at least one processor are configured to perform a method for obfuscating an algorithm. The method includes for receiving ciphertext input data, and providing ciphertext output data based on the algorithm and the cipher input data. The method further includes (1) receiving a first input encryption key to encrypt the cipher input data for the first program instructions; (2) receiving a first output decryption key to decrypt the cipher output data of the first program instructions; (3) receiving a first obfuscation key to generate the first program instructions from plaintext program instructions; (4) determining a first temporary encryption key; (5) determining a first temporary decryption key; (6) determining a first temporary obfuscation key; (7) determining a second input encryption key; (8) determining a second output decryption key; (9) determining a second obfuscation key based on the first input encryption key, the first output decryption key, the first obfuscation key, the first temporary encryption key, the first temporary decryption key and the first temporary obfuscation key; (10) determining second program instructions based on the first program instructions and the first temporary obfuscation key; and (11) determining third program instructions. The third program instructions are configured for (1) receiving ciphertext input data based on the second input encryption key, and (2) providing ciphertext output data based on the algorithm and the ciphertext input data. The ciphertext output data is an encrypted version of the plaintext output data. The method further includes storing the second program instructions, the second input encryption key, the second output decryption key, the second obfuscation key, the first temporary encryption key, the first temporary decryption key, and the first temporary obfuscation key.

In another embodiment, a non-transitory computer-readable storage medium stores computer instructions to be implemented on at least one computing device that includes at least one processor, the computer instructions when executed by the at least one processor cause the at least one computing device to perform a method for obfuscating an algorithm. The method includes for receiving ciphertext input data, and providing ciphertext output data based on the algorithm and the cipher input data. The method further includes (1) receiving a first input encryption key to encrypt the cipher input data for the first program instructions; (2) receiving a first output decryption key to decrypt the cipher output data of the first program instructions; (3) receiving a first obfuscation key to generate the first program instructions from plaintext program instructions; (4) determining a first temporary encryption key; (5) determining a first temporary decryption key; (6) determining a first temporary obfuscation key; (7) determining a second input encryption key; (8) determining a second output decryption key; (9) determining a second obfuscation key based on the first input encryption key, the first output decryption key, the first obfuscation key, the first temporary encryption key, the first temporary decryption key and the first temporary obfuscation key; (10) determining second program instructions based on the first program instructions and the first temporary obfuscation key; and (11) determining third program instructions. The third program instructions are configured for (1) receiving ciphertext input data based on the second input encryption key, and (2) providing ciphertext output data based on the algorithm and the ciphertext input data. The ciphertext output data is an encrypted version of the plaintext output data. The method further includes storing the second program instructions, the second input encryption key, the second output decryption key, the second obfuscation key, the first temporary encryption key, the first temporary decryption key, and the first temporary obfuscation key.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings:

FIG. 17 depicts a system diagram illustrating an SIMD operation block system that is configured by a block configuration key in accordance with embodiments of the present disclosure.

DETAILED DESCRIPTION

Figure 1:
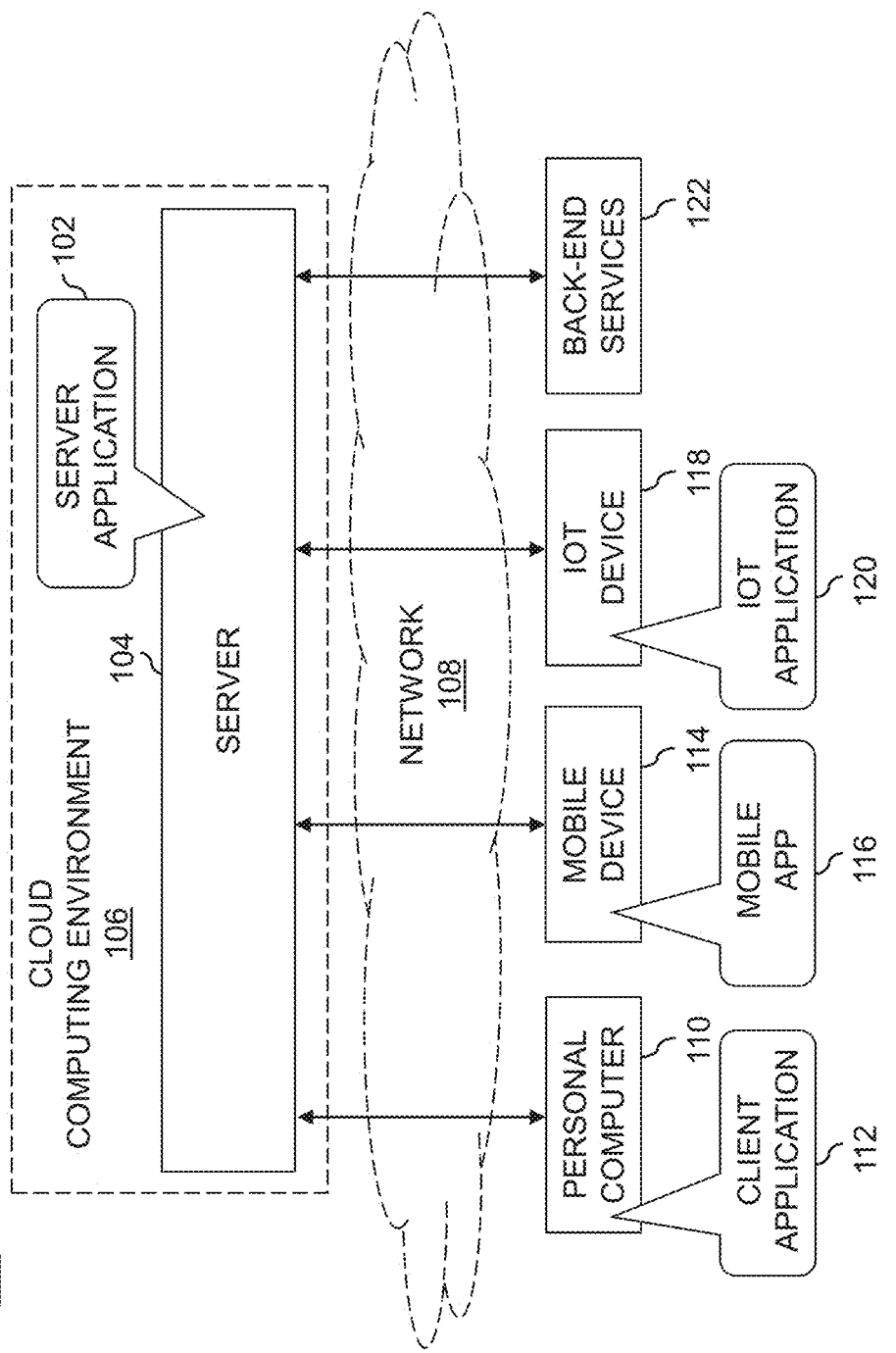
FIG. 1 depicts a system diagram illustrating a client/server architecture in accordance with embodiments of the present disclosure.

The present disclosure relates to encryption and cryptography. More specifically, the disclosure applies to systems and methods used to obfuscate and encrypt data, programs, and algorithms. Disclosed herein is a computer implemented method for providing an encrypted and obfuscated algorithm.

The following description and figures are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Unencrypted data may be referred to as plaintext data and encrypted data may be referred to as ciphertext data. The terms plaintext data and ciphertext data do not imply characters only but applies to all types of data regardless of format. The underlying information may include but is not limited to bits, quantum bits, bytes, real numbers, complex numbers, quaternions, characters, elements on cyclic groups such as $Z\_q$, $Z/Z\_q$, or vectors, matrices, tensors of any of the previously mentioned data types.

Disclosed herein are methods, systems, and devices for encrypted obfuscation wherein an adversary is prevented from retrieving any information related to the inputs, outputs and/or types of computation. This disclosure describes obfuscation for ciphertexts, wherein the input data and output data are both encrypted. Unlike secure multiparty computation, obfuscation does not assume that a part of the computation is hidden from an adversary. By using encrypted input and output data all the computation can be exposed to the adversary without revealing the computation algorithms.

When using the Turing representation, algorithms are broken into instructions that are compositions of operations between variables such as multiplication, addition, subtraction, and branching operations such as conditional if statements, recursions as well as iterations, jumps to other sets of instructions and output of the result. The embodiments of the current disclosure focus on the Turing representation of algorithms. However, the disclosure is applicable to all forms of implementation of algorithms such as and not limited to circuits or random access machines (RAMs) algorithms.

With this disclosure, both the encrypted data and obfuscated algorithm remain secure throughout processing and evaluation. Because neither the algorithm nor the data need to be decrypted to operate, no decryption key is needed until the encrypted final results are decrypted. During operations, additional synthetic data is added to the original inputs, ensuring that the encrypted form of the input data always appears differently no matter how many times the same data is encrypted. This approach to data encryption provides resiliency to man in the middle, rainbow, or lunchtime attacks.

Additionally, algorithms are protected by the obfuscation of the underlying operations and subsequent encryption of the coefficients in the algorithm. These obfuscated base operations can be used to process data in parallel. The encrypted coefficients and obfuscated algorithm rely on a method that enables computation directly on the encrypted input data without any decryption. During computation, no information about the data is leaked to any third party, including the entity performing the computation.

The disclosed program obfuscation converts complex programs into a set of basic operations populated by the algorithm coefficients. Additional values are added to this set of operations by combination and augmentation, generating a tensor representation that appears completely random.

The disclosed encryption process takes plaintext data and uses a set of operations to fully encrypt the plaintext into ciphertext. The process first augments the data with random values, then passes the augmented data through one or more operations to generate fully encrypted ciphertext that is indistinguishable from completely random values.

The disclosed obfuscation process uses encrypted ciphertext as input and is composed of a sequence of basic operations. Each of the sequence of operations may perform, but is not limited to, one or more of the following actions:
 (a) augment the input ciphertext, e.g., insert constant element, insert nonlinear transformation of each element, insert random numbers, etc.
 (b) apply a linear or nonlinear operation on the input ciphertext, e.g., matrix/tensor multiply, table lookup, etc.
 (c) apply a conditional operation to generate a single or a plurality of ciphertext output depending of the result of the conditional operation,
 (d) apply a verification step such as signature creation.

Each of the operations that make up the full obfuscated algorithm operates on multidimensional vectors or tensors in a similar manner to single instruction multiple data (SIMD) that are commonly implemented on computer and graphic processing units.

Each operation is further obfuscated by pre- and post-processing of the individual operators that compose the unit. Both the pre- and post-process methods use an oblivious random operation in such a way that the preprocess of the following step is cancelled by the post process of the prior step. The pre- and post-processing operations are fully integrated into the obfuscated algorithm as though they were part of the original obfuscation method operating on the original ciphertext. For the original function $f(x)$, where the observation x has been converted into the vectorized form X, the initial obfuscation step is shown in equation 1.

$$f(x) = X M_0 M_1 M_2 \ldots \qquad [1]$$

The following initial encryption of the obfuscated function uses both the pre- and post-processing operations, so that the encrypted function $f_E(x)$ is shown in equation 2.

$$f_E(x) = (XE_0)(E_0^{-1}M_0E_1)(E_1^{-1}M_1E_2)(E_2^{-1}M_2E_3)\ldots \quad [2]$$

Where $E_0, E_1, E_2, E_3, \ldots$ are encryption operators. When the encrypted algorithm is updated with new pre- and post-processing keys, then the updated encrypted function $f_{\tilde{E}}(x)$ is shown in equation 3.

$$f_{\tilde{E}}(x) = ((XE_0)E_{00})(E_{00}^{-1}(E_0^{-1}M_0E_1)E_{11})(E_{11}^{-1}(E_1^{-1}M_1E_2)E_{22})(E_{22}^{-1}(E_2^{-1}M_2E_3)E_{33})\ldots \quad [3]$$

Where $E_{00}, E_{11}, E_{22}, E_{33}, \ldots$ are new encryption operators. The encryption operators are tensors that may consist of, but are not limited to, integer, rational, or complex values, of specific construction including invertible, upper or lower triangular, diagonal, block composition, or block diagonal composition.

For a given set of data and an algorithm applied to the data, the progression of encryption, obfuscation, and evaluation can be as follows:

1. Vectorized plaintext is augmented.
2. Ciphertext is encrypted using operator dependent on the provided key.
3. Algorithm is obfuscated by transforming into sequence.
4. Sequence of linear matrices that make up algorithm is augmented.
5. Algorithm is obfuscated using from 1 to N operators, the initial operator being dependent on the provided key.
6. Ciphertext is read into initial operation of obfuscated algorithm using vector-matrix multiply.
7. Output of initial sequence of obfuscated algorithm is read into the next operation using vector-matrix multiply.
8. Repeat until the end of the obfuscated algorithm is reached.
9. Return encrypted results.
10. Decrypt results using the decryption operator dependent on the provided key.

Depending on the level of expected or required protection against attacks, the pre- and post-processing for each individual operations can be done every time the method is used, updated periodically, or left as they were initially created. The period may be a fixed time period or based on the number of computations performed between updates. The pre- and post-processing can be applied recursively, that is they can be performed multiple times on operation steps, even if they were already processed. (See FIG. 3B)

By obfuscating each individual operation in the overall sequence, the pre- and post-processing can be applied easily. Since the obfuscation of the algorithm corresponds with being able to operate on encrypted ciphertext, the disclosed invention allows for a data owner/supplier and algorithm owner to work with a third party, e.g., a compute platform, without exposing either data or computational method to either of the other two parties.

APPLICATIONS AND EXAMPLES

Applications of program obfuscation include protection of intellectual property of algorithms and programs as well as retaining the integrity of a program, unlike homomorphic encryption which leaves the program readily legible but focuses solely on encrypting the data. The disclosed method operates in such a way that no decryption is required during computation. The objective of encryption is to make data unintelligible without a decryption process in order to protect the data when stored (data at rest) or transmitted (data in transport). The disclosed invention protects both data and programs. Examples of applications and additional outcomes of the disclosed invention include but are not limited to:

Cloud computing
Embedded systems
Generation of crippleware and time limited licenses for software
Prevention of reverse engineering
Auditing data and programs without disclosing what the audit does
Program verification and certification
Reproducible research where algorithms and datasets are protected
Database queries on encrypted data without disclosing information about either the data or the query
Protecting elements of software products dynamically.
Protecting compilers from leak of information and tampering in dead prefetch branches
Create a new class of compilers by leveraging single instruction multiple data (SIMD)
Provide obfuscation to homomorphic algorithms
Provide quantum safe encryption of algorithms and data
Encrypt databases and search on encrypted data
Perform functional encryption operations where the computing entity does not need to decrypt the input but only has access to the secret key, including.
  a. Identity Based Encryption (IBE)
  b. Attribute Based Encryption (ABE)
  c. Predicate Encryption
  d. Searchable Encryption
Distribute encryption and/or obfuscation keys
Verify software, i.e., using the encrypted function as input to the function to verify it is the same as would be expected from an unencrypted method
Periodically update encrypted databases
Encrypt algorithm that have been already encrypted
Provide differential privacy to maintain anonymity of data origin or person.

Use Cases

Use Case 1 is "distributed encrypted databases". A database of protected data owned or administrated by party A is publicly available or available upon request. Party B has built an algorithm on prior owned data that is the same format as data owned by party A. Party A wants to protect the data for privacy or security reasons, but still wants to allow development with respect to other parties for either research or profit. By encrypting its data with an set of encryption keys, party A can allow access to party B while protecting the contents of the data. Party B can submit encrypted obfuscated queries to the main dataset and perform operations on party A's data without party A knowing what queries were submitted or what operations party B is performing. Party B can even store party A's data locally without any danger of exposure as only party A can decrypt the data.

Use case 2 is "distributed encrypted algorithms". Algorithm owned by party A is deployed on a cloud server or hosted locally for use by other parties. Party B owns or administrates a large dataset that can be operated on by party A's algorithm. Party B, wishing to use party A's algorithm for computational purposes but not wanting to reveal its data, encrypts the data while party A obfuscates and encrypts its algorithm, so that party A cannot see any sensitive information contained in the data, and party B cannot steal the coefficients that make up party A's algorithm.

Use case 3 is "algorithm distribution". Party A creates an algorithm trained on prior owned data that it wishes to deploy as an embedded program on party B's hardware, such as a local server or a smartphone. The data will be generated and owned by party B, but party A's algorithm is embedded in an effort to reduce computation time needed and eliminate the need for data transmission. To protect party A's algorithm, the algorithm is obfuscated and encrypted before being installed on the hardware along with a key generator that creates new keys on a schedule for new batches or instances of data from party B. The algorithm and its coefficients are protected and party B is able to use the algorithm in an embedded system.

Use case 4 is "data update security". Party A creates an algorithm trained on prior owned data but faces large computational burdens to continue processing new data with the algorithm. In order to reduce its computational responsibilities, party A purchases compute power from a cloud server owned or administrated by party B. To protect both its data and algorithm, party A can encrypt its data and obfuscate its algorithm to upload to party B's cloud computing service without compromising either.

Use case 5 is "insider threat". Party A is developing an algorithm trained on prior owned data, but suspects that an employee has been selling information about the coefficients used in the method. To protect from internal attacks, the algorithm can be encrypted and only used with proper keys that can be controlled by a central source in party A.

Use case 6 is "theft protection". Party A has suffered a security breach by party B, resulting in the loss of either encrypted data, encrypted algorithms, or both. By encrypting the data and algorithm with different keys and using updates to ensure correct computation when the data is input to the algorithm, party A is protected from party B being able to access the data, the algorithm, or the results of applying the algorithm to the data as party B does not have the key updates that allow correct computation.

Use case 7 is "three parties/database mining". Party A has information that it must be processed by Party B and the results of the operation must be retrieved by Party C. Party A does not want to disclose the data to the other two parties and only wants Party C to know the results of the operation. Party B does not want to disclose any information about its algorithm. Party C does not want to have the plaintext results disclosed to the other parties.

Use case 8 is "general data protection regulation". To protect an individual's personal data, e.g., age, gender, location, IP address, a mobile phone or other personal computing device encrypts all data using a private/public key and all communications to a server is processed without decryption. For example, one country's server may be configured to strip specific information, while in another country additional or different sensitive information may be required to be removed. These separate policies for removal can be implemented in the encrypted domain without decryption. This process may be implemented to be cascaded or run in parallel. Furthermore, as data restriction requirements evolve over time, the encrypted obfuscated algorithms may be updated to further filter the encrypted data without decryption in a different way. These policies may be implemented by creating intermediary master obfuscation encryption keys that are shared by all algorithms. These keys may be used to update the data encryption and decryption keys as well as the actual algorithm key associated with these updated keys. Examples of algorithms that operate in the encrypted domain may include data anonymizing to prevent future re-identification based on side-channel information, deletion of personal data in the encrypted domain, prevention of storing data outside specific locations or server addresses, and updating personal data that has been improperly entered at the request of a trusted/authenticated party. As stored encrypted data may be subject to future data attacks, any stored encrypted personal data may be periodically reencrypted. The reencryption algorithm can also be implemented in the encrypted domain. Likewise, the encrypted algorithm and output of the algorithm may also be forwarded to the person that generated the personal data for his/her review using an encrypted/obfuscated algorithm. Additionally, an encrypted algorithm may be crated to aggregate sensitive data without decryption in order for a third party to verify if the encrypted algorithms produce biased or discriminative results.

Embodiments of Individual Methods

An embodiment of the invention is to convert machine learning (ML) algorithms into an obfuscated system. While the architecture of ML algorithms is standard and widely available, the values of the parameters are the essential element that differentiate between a good or poor performance in the prediction/output. These parameters are often kept secret to not only protect the time and money invested to compute them but also to prevent tampering with them. This disclosure includes details of the obfuscated embodiments of some methods, both in the field of machine learning and other data processing or manipulation algorithms.

1) Linear Regression

A canonical example of a basic machine learning method is linear regression. In this particular case, the operation can be represented as a matrix multiply on plaintext vectors or tensors. If a composition of functions is used, then the sequence of functions can be represented as multiple matrix multiplies. The matrix form of a linear regression can be seen as shown in equation 4.

$$f(x)=x_0 M_0 \ldots \qquad [4]$$

Where $x_0$ is the plaintext vector and $M_0$ is the matrix of regression coefficients. After obfuscation, the data is encrypted using a random matrix $E_0$ such that $z_0=x_0 E_0$. The subsequent computation matrix $M_0$ is changed into $N_0$ where $N_0=E_0^{-1} M_0 E_1$ where $E_i$ are invertible random matrices and do not cause roundoff error when chained. $E_0$ and $E_1$ are distributed.

This encryption is quite naive as when submitting an input multiple times, the temporary values and output will remain the same providing an opportunity for a rainbow attack (aka look up table). A nonce that can be added to the input data to avoid this attack. However, with sufficient time, the matrices and nonce can be defeated with simple matrix inversion. By integrating a randomized nonce within each updated matrix $N_i$ and adding additional randomized data such as salting, the operation become difficult to break. To avoid attacks the matrices $N_i$ may be periodically updated by creating additional temporary matrices E; that can be forgotten.

The matrix multiplies may be performed on real numbers but also on other cyclical groups such as those used in Learning With Error (LWE) methods. In this configuration at each operation a random small value can be added to the operation within each matrix multiply, so that the periodic update of the matrices may be extended.

2) Decision Tree Learning

A decision tree is a predictive algorithm that takes a plurality of observations of an item to a conclusion about the item. For instance, a tumor may be classified as malignant or benign based on its observed color, area, height, maximum width, shape, location, etc. The algorithm uses a tree-like decision graph where at each node a given feature of each observation is tested, e.g., if the maximum width is greater than 3 mm. Each branch after a node corresponds to a given outcome of the test. Each branch lead to a node that performs another test or a terminal node that assigns a final conclusion, e.g., the tumor is benign. The corresponding algorithm is typically transcribed into a sequence of if-else pseudocode statements on a observations and reference values, as shown in the following example:

If (x[1]−2<0) do:
    If (x[0]−0.1<0) do:
        Return Benign
    Else:
        If x[3]−10<0
            Return Benign
        Else:
            Return Malignant
Else:
    Return Malignant One possible obfuscation strategy is to first balance the tree to guarantee constant computation time regardless of observations. Second, each level of if/else statement is transformed into a matrix multiply that computes $x[i]-t[j]$ where $x[i]$ is the ith observation, and $t[j]$ is the threshold of node j. The output of each obfuscated step also contains the input observations and the all the outputs of the previous levels to guarantee proper chaining. At each step, the data is further augmented to provide constant size of the input/output vector/matrix between each step. On the last step, the path of all decisions made for each node can be tracked based on the sign of $x[i]-t[j]$. A final matrix multiply performs the verification of the decision state that lead to each terminal node. This matrix multiply is then followed by a final decision to determine the output value.

The resulting obfuscated algorithm can then be encrypted by transforming each matrix in each matrix multiply using the pre/post processing method described above.

3) Augmentation and Kernel Functions

In order to protect the sequence of instructions, an essential element of the invention resides convert a sequential set of operations into a reduced number of elementary/atomic operations that operate in parallel on a vector/matrix/tensor/plurality of elementary data. The tensors may be constructed by concatenating multiple data sets, or augmenting the data with a "kernel trick", i.e., a highly non-linear Function, $x \rightarrow [1, x, x^2, \sin(x)]$. For example, this operation is used when the algorithm includes polynomial computations.

The augmentation may also include salting, i.e., the insertion of random numbers that can be generated from a pseudorandom function (PRF). The type of random number or PRF affects the strength of the encryption. In order to reduce the effect of noise accumulation. It may also include trapdoors that can be inverted with a simple gadget matrix.

The augmentation of a vector $X=[x_0\ x_1\ x_2\ x_3\ \ldots]$ can be done with multiple methods, including but not limited to adding a deterministic or random nonce, salting with deterministic or random values, or any combination thereof. Using a deterministic or random nonce, the augmented vector $X_A$ is shown in equation 5.

$$X_A = [x_0 x_1 x_2 x_3 \ldots x_{N-1} x_N | n_0 n_1 n_2 n_3 \ldots n_M] \quad [5]$$

The values $n_0$, $n_1$, $n_2$, $n_3$, ... make up the nonce, either by a predetermined algorithm or a PRF number generator. To create an augmented vector using salting, the result would be is shown in equation 6.

$$X_A = [x_0 \alpha_0 x_1 \alpha_1 x_2 \alpha_2 x_3 \alpha_3 \ldots x_N \alpha_N] \quad [6]$$

The values $\alpha_0$, $\alpha_1$, $\alpha_2$, $\alpha_3$, ... are given by either by a predetermined algorithm or a PRF number generator.

4) Branching and Conditional Operations

Branching operations, thresholds, or other conditionals such as if or where statements can be represented as a sign check of a vector-matrix projection. These results can be read as if a vector is being operated on by a conditional or branching statement, then it can be represented as a sequence of matrix multiplies. Using a matrix constructed as an equivalent to subtraction between vectors multiplied by another matrix acting as a projection operator, the sign of the result indicates which side of the projection vector the observation is on. This matrix form can be encrypted with the same pre and post processing encryption operations as the previously described linear regression and decision tree obfuscation forms. The vector subtraction $Z=X-Y$ can be rewritten as a matrix multiply as shown in equation 7.

$$Z = [X|-I][I|Y]^T \quad [7]$$

The vector projection onto vector V is subsequently found by $P = Z V^T$. This matrix form can be used in sequence as well to determine the truth value of multiple conditional statements.

Key Distribution

The current disclosure is fully compatible with distribution of keys in order to provide the initial encryption and decryption key for input and output data as it must match the obfuscation key. In addition, the key distribution algorithm can also be obfuscated to further ensure encryption of the encrypted keys. An embodiment is to keep an original encrypted obfuscation scheme and generate updated obfuscated algorithms and keys using an encrypted obfuscation update scheme. Likewise, the obfuscation key will be merged with the first obfuscated operation with the inverse of the data encryption update key and the last obfuscation operation with the inverse of the data decryption update key to guarantee that the consistency of the obfuscated algorithm, i.e., the decrypted output is identical to the plaintext output of the original algorithm applied to the plaintext input. (See FIG. 12).

This disclosure also includes a method for key exchange. This stenographic method allows for encryption and exchange of keys composed of integer values, further encrypted by a public-key encryption system such as RSA or elliptic curve encryption. Because the main obfuscation and data encryption key can be constructed from multiple integer values, this stenographic encryptor allows easy exchange of the same key in multiple ways, protecting against brute force attacks and/or leakage of information.

Other extensions of the disclosed embodiments include:

1) Parallelization

Each simple operation can be performed on blocks of plaintext and ciphertext in order to provide a parallel implementation that may not require further transport encryption. This approach provides a way to cipher obfuscate algorithms on a multiprocessor/multi worker system where the transmission between processors/worker may be compromised.

2) Further Encryption and Public Key Distribution

The generalizable nature of the invention make the invention applicable to "ciphertext obfuscation" of already existing algorithms that operate on encrypted data or obfuscated algorithms or previously "ciphertext obfuscated" algorithm to make cracking harder.

Using the pre/post processing concatenation technique described above, an encrypted obfuscated algorithms using given input encryption and output decryption keys can create additional encryption/decryption keys and distribute additional encrypted algorithms. This technique provide the ability to create public key and private keys for encryption and decryption.

3) Encryption Verification

Using a method similar to the concept of a nonce or other augmentation, the invention can be used to verify that the data received, algorithm used, or results generated are coming from, computed by, or received by the correct entity. After transmission through another secure channel, a verification key can be used to check the decrypted data or deobfuscated algorithm against what was received.

FIG. 1 depicts a system diagram 100 illustrating a client/server architecture in accordance with embodiments of the present disclosure. The server application 102 is configured to provide an encrypted and obfuscated algorithm. A server application 102 is hosted on a server 104 within a cloud computing environment 106. The server application 102 is provided on a non-transitory computer readable medium including a plurality of machine-readable instructions, which when executed by one or more processors of the server 104, are adapted to cause the server 104 to perform a method for obfuscating an algorithm. The method includes (1) receiving ciphertext input data, and (2) executing obfuscated program instructions using the ciphertext input data and an obfuscation key. The ciphertext input data is based on plaintext input data encrypted using an input encryption key. The obfuscated program instructions are configured for concealing initial program instructions. The initial program instructions are configured for (1) receiving the plaintext input data, (2) providing plaintext output data based on an algorithm, and (3) providing ciphertext output data. The ciphertext output data is configured for decryption to provide the plaintext output data.

The server application 102 is configured to communicate over a network 108. In a preferred embodiment, the network 108 is the Internet. In other embodiments, the network 108 may be restricted to a private local area network (LAN) and/or private wide area network (WAN). The network 108 provides connectivity with a plurality of client devices including a personal computer 110 hosting a client application 112, a mobile device 114 hosting a mobile app 116. The network 108 also provides connectivity for an Internet-Of-Things (IoT) device 118 hosting an IoT application 120 and to back-end services 122

Figure 2:
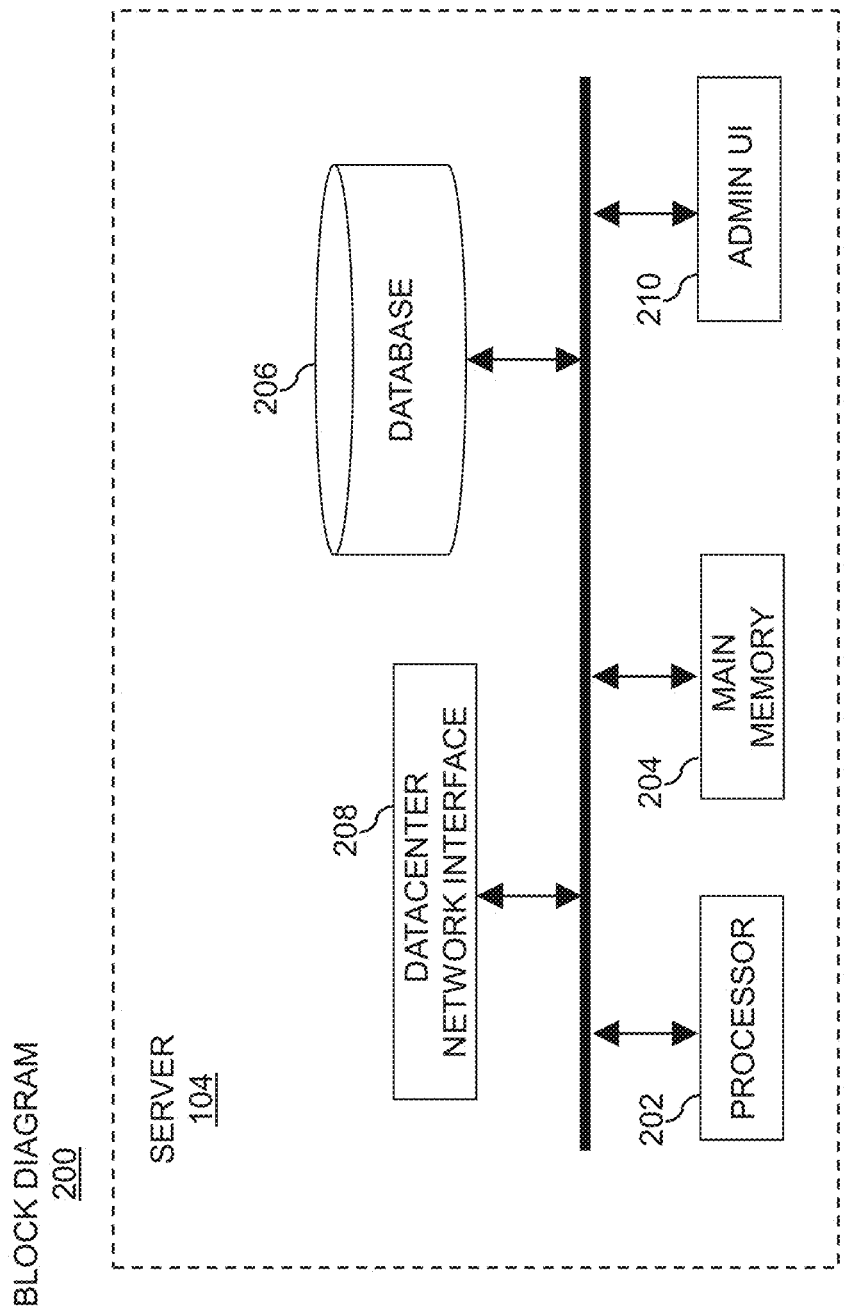
FIG. 2 depicts a block diagram of a server in accordance with embodiments of the present disclosure.

FIG. 2 depicts a block diagram 200 of the server 104 of FIG. 1 for hosting at least a portion of the server application 102 of FIG. 1 in accordance with embodiments of the present disclosure. The server 104 may be any of the hardware servers referenced in this disclosure. The server 104 may include at least one of a processor 202, a main memory 204, a database 206, a datacenter network interface 208, and an administration user interface (UI) 410. The server 200 may be configured to host one or more virtualized servers. For example the virtual server may be an Ubuntu® server or the like. The server 204 may also be configured to host a virtual container. For example, the virtual server may be the Docker® virtual server or the like. In some embodiments, the virtual server or virtual container may be distributed over a plurality of hardware servers using hypervisor technology.

The processor 202 may be a multi-core server class processor suitable for hardware virtualization. The processor 202 may support at least a 64-bit architecture and a single instruction multiple data (SIMD) instruction set. The memory 204 may include a combination of volatile memory (e.g. random access memory) and non-volatile memory (e.g. flash memory). The database 206 may include one or more hard drives.

The datacenter network interface 208 may provide one or more high-speed communication ports to the data center switches, routers, and/or network storage appliances. The datacenter network interface may include high-speed optical Ethernet, InfiniBand (IB), Internet Small Computer System Interface iSCSI, and/or Fibre Channel interfaces. The administration UI may support local and/or remote configuration of the server by a data center administrator.

Figure 3:
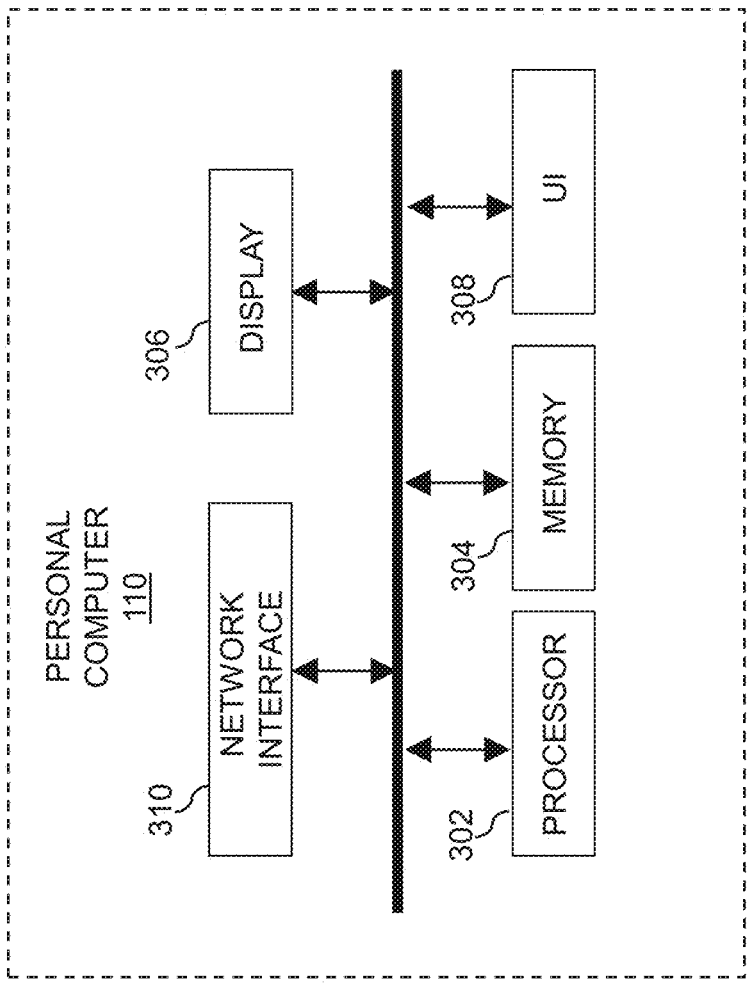
FIG. 3 depicts a block diagram of a personal computer in accordance with embodiments of the present disclosure.

FIG. 3 depicts a block diagram 300 of the personal computer 110 of FIG. 1 in accordance with embodiments of the present disclosure. The personal computer 110 may be any of the client devices referenced in this disclosure. The personal computer 110 may include at least a processor 302, a memory 304, a display 306, a user interface (UI) 308, and a network interface 310. The personal computer 110 may include an operating system to run a web browser and/or the client application 112 shown in FIG. 1. The operating system (OS) may be a Windows® OS, a Macintosh® OS, or a Linux® OS. The memory 5304 may include a combination of volatile memory (e.g. random access memory) and non-volatile memory (e.g. solid state drive and/or hard drives).

The network interface 310 may be a wired Ethernet interface or a Wi-Fi interface. The personal computer 110 may be configured to access remote memory (e.g. network storage and/or cloud storage) via the network interface 310. The UI 308 may include a keyboard, and a pointing device (e.g. mouse). The display 306 may be an external display (e.g. computer monitor) or internal display (e.g. laptop). In some embodiments, the personal computer 110 may be a smart TV. In other embodiments, the display 306 may include a holographic projector.

Figure 4:
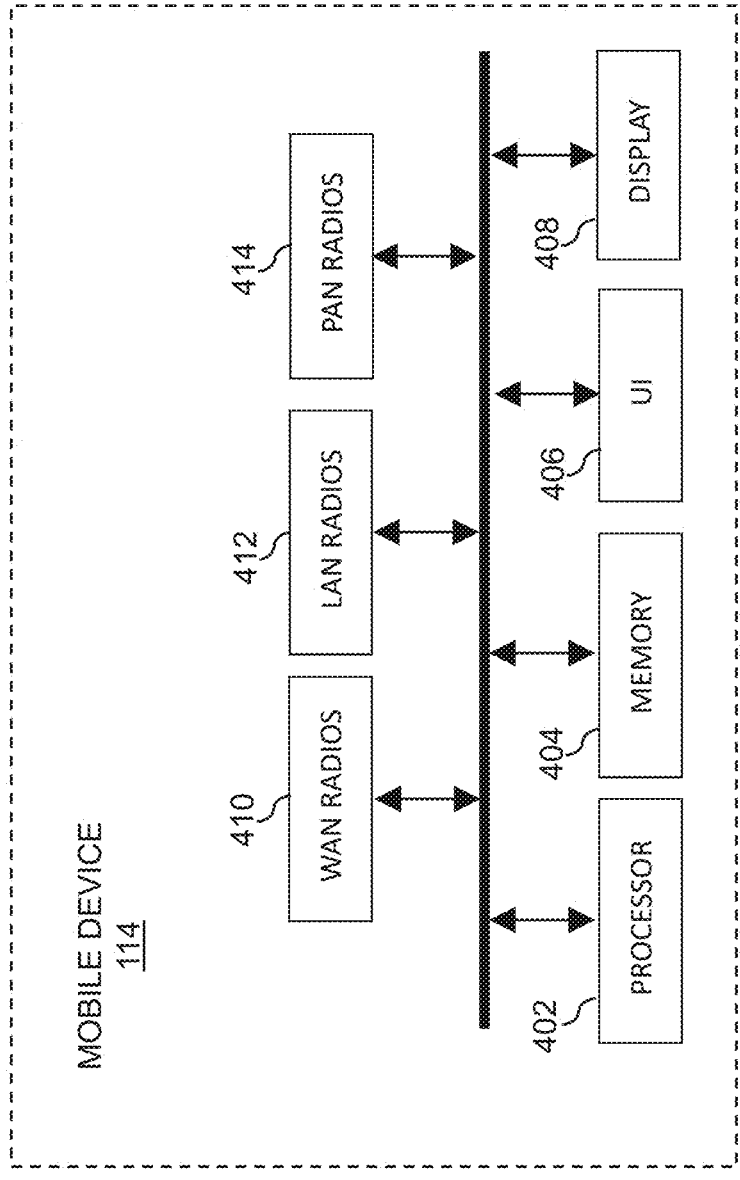
FIG. 4 depicts a block diagram of the mobile device in accordance with embodiments of the present disclosure.

FIG. 4 depicts a block diagram 400 of the mobile device 114 of FIG. 1 in accordance with embodiments of the present disclosure. The mobile device 114 may be any of the client devices referenced in this disclosure. The mobile device 114 may include an operating system to run a web browser and/or the mobile app 116 shown in FIG. 1. The mobile device 114 may include at least a processor 402, a memory 404, a UI 406, a display 408, WAN radios 410, LAN radios 412, and personal area network (PAN) radios 414. In some embodiments the mobile device 114 may be an iPhone® or an iPad®, using iOS® as an OS. In other embodiments the mobile device 114 may be a mobile terminal including Android® OS, BlackBerry® OS, Chrome® OS, Windows Phone® OS, or the like.

In some embodiments, the processor 402 may be a mobile processor such as the Qualcomm® Snapdragon™ mobile processor. The memory 404 may include a combination of volatile memory (e.g. random access memory) and non-volatile memory (e.g. flash memory). The memory 404 may be partially integrated with the processor 404. The UI 406 and display 408 may be integrated such as a touchpad display. The WAN radios 410 may include 2G, 3G, 4G, and/or 5G technologies. The LAN radios 412 may include Wi-Fi technologies such as 802.11a, 802.11b/g/n, and/or 802.11ac circuitry. The PAN radios 414 may include Bluetooth® technologies.

Figure 5:
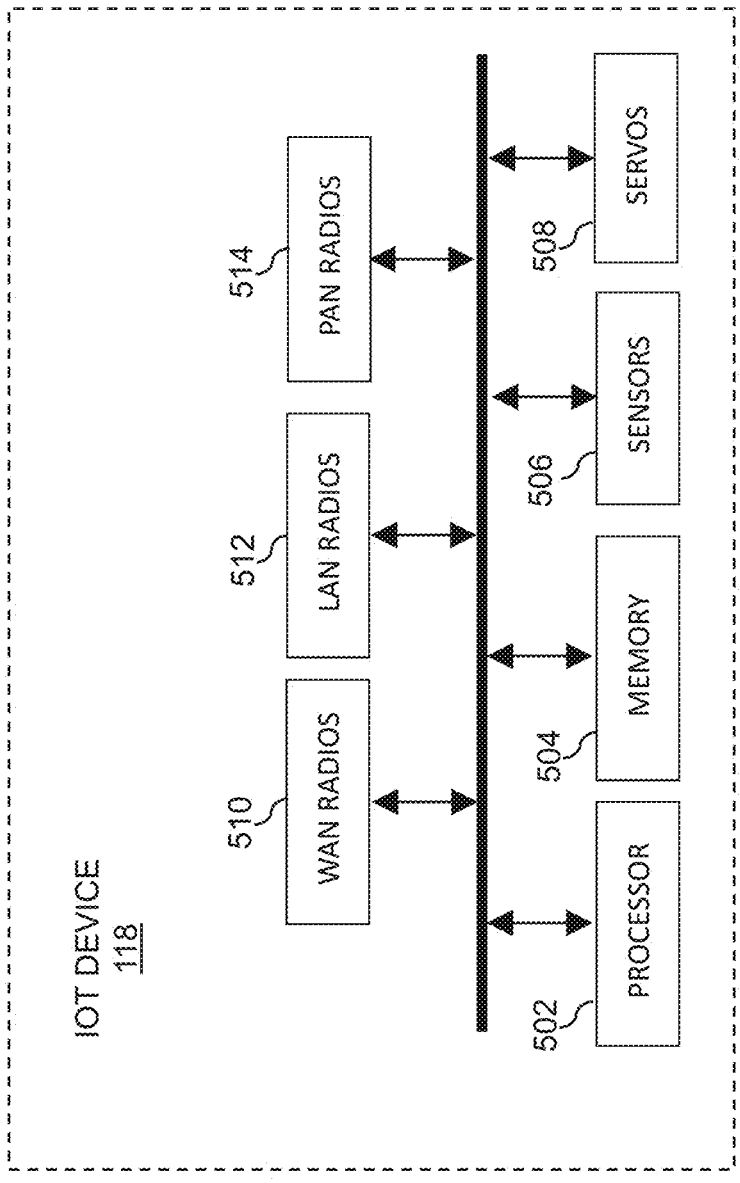
FIG. 5 depicts a block diagram of an Internet-of-Things (IoT) device in accordance with embodiments of the present disclosure.

FIG. 5 depicts a block diagram 500 of the IoT device 118 of FIG. 1 in accordance with embodiments of the present disclosure. The IoT device 118 may be any of the client devices referenced in this disclosure. The IoT device 118 includes a processor 502, a memory 504, sensors 506, servos 508, WAN radios 510, LAN radios 512, and PAN radios 514. The processor 502, a memory 504, WAN radios 510, LAN radios 512, and PAN radios 514 may be of similar design to the processor 402, a memory 404, WAN radios 410, LAN radios 412, and PAN radios 414 of the mobile device 114 of FIG. 4. The sensors 506 and servos 508 may include any applicable components related to IoT devices such as a monitoring device, an autonomous vehicle, a home assistant, a smart appliance, a medical device, a virtual reality device, an augmented reality device, or the like.

Figure 6:
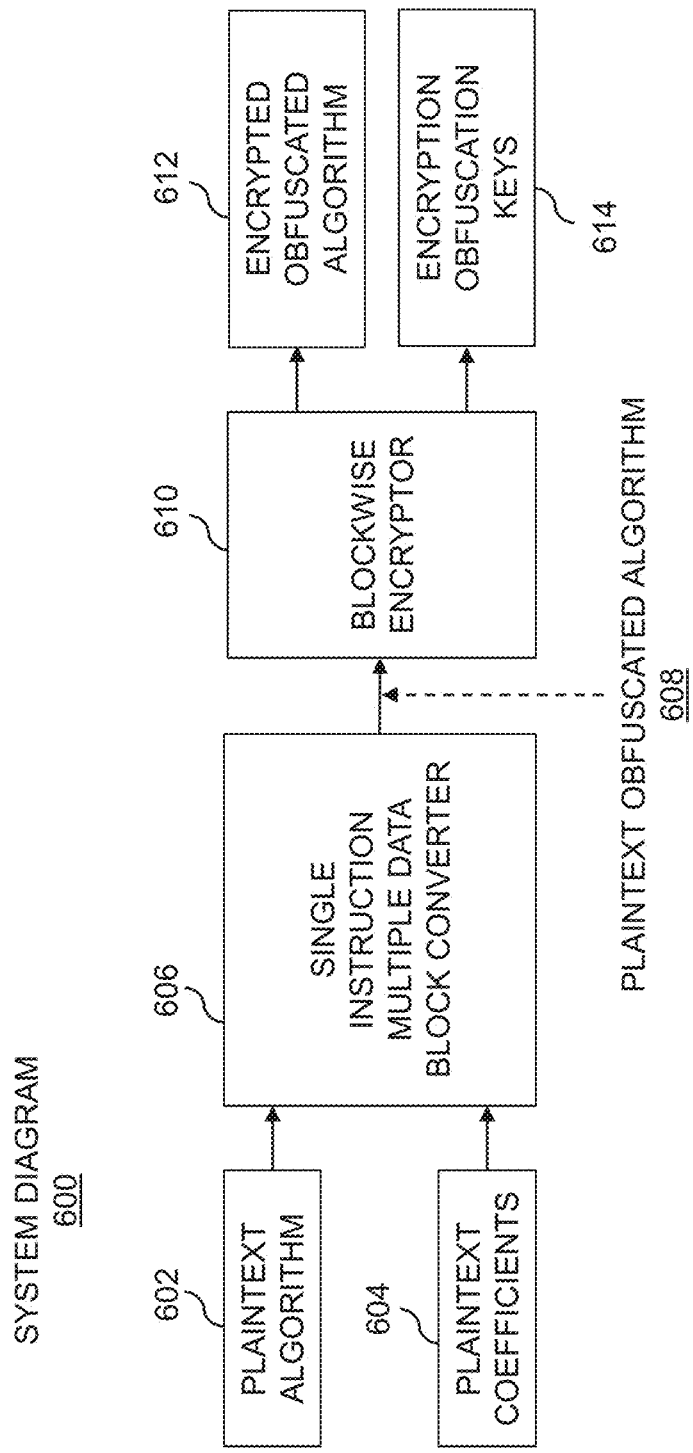
FIG. 6 depicts a system diagram illustrating an encrypted obfuscated implementation of an algorithm in accordance with embodiments of the present disclosure.

FIG. 6 depicts a system diagram 600 illustrating an encrypted obfuscated implementation of an algorithm in accordance with embodiments of the present disclosure. FIG. 6 further illustrates exemplary high level steps involved in the creation of encryption, decryption, obfuscation and deobfuscation keys and the encrypted obfuscated implementation of an algorithm. A source provides a plaintext algorithm 602 along with plaintext coefficients 604. The source of the algorithm can be an active device, a readable device, a computer that provides a list of instructions such as uncompiled plaintext code written in a computer language, e.g., python, C++, Java, JavaScript, Lua, Matlab, PHP, Perl, Julia, CUDA, R, SAS, Objective C, Swift, OpenGL, C#, Fortran, Clojure, Kotlin, Haskel, Tensorflow, or the like. The source of the algorithm can also be compiled code, intermediate code representation, binary code generated via a compiler, or circuit or random access machine code. The source of the algorithm may also be an obfuscated algorithm or an algorithm that is decrypted from another encryption scheme. The source of the coefficients 604 may be a computer, a readable device, or a memory storage device. The coefficients may be stored as bits, integers, fixed point, floating point real numbers, complex numbers, quaternions, characters, quantum bits, or strings. These coefficients may be fully integrated into the plaintext algorithm 602. Even if they are independent, the sources of the algorithm 602 and the coefficients 604 may be identical. An example of algorithm 602 is a single variable linear regression implemented in Tensorflow, where the coefficients are the corresponding slope and intercept. In another example, the algorithm 602 is a decision tree implemented as a series of NAND gates where the coefficients are the thresholds used for each decision.

The plaintext algorithm 602 and coefficients 604 are the input of the Single Instruction Multiple Data (SIMD) block operation converter 606 that performs the obfuscation of the program. The SIMD block operation converter 606 may be a computer that converts the operations into a sequence of simple instructions. These instructions take multiple inputs and first repackage them as vectors, matrices, or tensors, then augment the resulting vectors, matrices, or tensors, and finally apply a linear operation followed by non-linear operation. The result is a plaintext obfuscated algorithm 608 where all the instructions appear identical in the program and the coefficients are fixed, parameterized, or hard coded. The algorithm conversion can also be performed by an automated program such as a compiler. The obfuscated algorithm 608 may be implemented as another uncompiled plaintext code, compiled code, intermediate code, or binary code, etc. If the format is uncompiled plaintext code, the language may be different than the plaintext algorithm 602. An example of the obfuscation conversion is described later in FIG. 16. The plaintext obfuscated algorithm serves as input to the blockwise encryptor 610. The output of 610 is an encrypted obfuscated algorithm 612 and a set of encryption obfuscation keys 614. The operations performed by the SIMD block operation converter 606 and blockwise encryptor 610 may be performed in a single operation. The output encrypted obfuscated algorithm 612 may be plaintext computer code, compiled code, or encrypted code for further distribution. The encryption and obfuscation keys 614 may also include decryption and deobfuscation keys, and can be separately bundled. The program can be written on or transmitted to a supporting device that allows transmission via a network, a writable and/or readable support, or memory in a device. The target of the encrypted obfuscated algorithm 612 may be a computer device in the cloud that further compiles the encrypted obfuscated algorithm 612 into machine code. In another embodiment, the target of the encrypted obfuscated algorithm 612 may be compiled code to be loading onto a mobile device such as a cellular phone, or another smart device that performs computation on the edge. In another embodiment, the target of 612 is a field programmable gate array code to be loaded onto an embedded platform. In another embodiment, the target of 612 is a set of design requirements, implementation of a circuit from implementation onto an application specific integrated circuit (ASIC). The target of the algorithm is not limited to a processing unit on an autonomous vehicle, a location device, a medical sensor, a thermostat, lighting device, smart television, digital assistant device, voice activated device, camera, kiosk, automated teller machine, quantum computer, and/or or a personal computing device.

Figure 7:
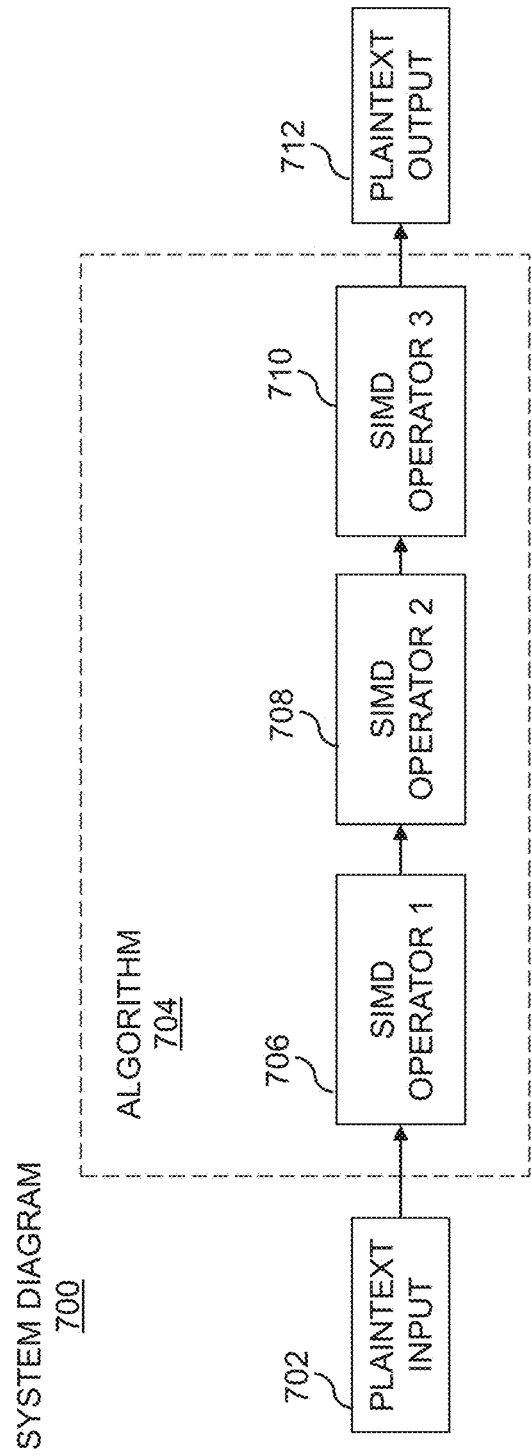
FIG. 7 depicts a system diagram illustrating an obfuscated algorithm processing plaintext data in accordance with embodiments of the present disclosure.

Operations 608 and 610 may be combined without creation of an intermediate plaintext obfuscated algorithm. This embodiment may be useful to provide additional security to prevent the creation of malware when the output of block 608 or the input of 610 could be compromised and changing the SIMD algorithm to be encrypted. The encrypted obfuscated algorithm 612 may also be an algorithm that performs the same operations or tasks as those described in FIG. 1. The encryption and obfuscation keys 614 may include additional metadata to provide authentication, certification, verification, and time stamping. Such metadata may include tokens and certificates. Each encryption, decryption, obfuscation, or deobfuscation key may have a unique target. For example, the encryption key for the input may be dedicated to a device that encrypts a person's vital signals. The corresponding obfuscation key is then transmitted to a machine that provides software as a service where the encrypted obfuscated algorithm 612 is performed. The decryption key is subsequently sent to a medical doctor that analyzes the results of the algorithm performed on the vital signs. A decryption key for the input may also be forwarded a trusted party that may be required to decrypt the input or output data based on a court order or contractual agreement. This decryption key may also be a multiparty decryption key that requires physical access to the device hosting the encrypted input or output data to prevent identity theft or other malfeasance. Similarly, a set of deobfuscation keys may be sent to other trusted party to provide full disclosure regarding the accuracy of the algorithm. The keys and the algorithm may be designed to have a deactivation policy. This deactivation policy disables the keys and programs based to at least one of the following actions: an erroneous authentication, timestamp beyond an expiration date, a number of computations of the algorithm beyond a prescribed limit, attempts of using an erroneous key above a prescribed limit, etc. In another embodiment, the key and the encrypted obfuscated algorithm are set up to create differential privacy. For example, the input or output data is purposely randomized to provide anonymity and prevent reverse correlation. This embodiment is particular important when the obfuscated encrypted algorithm trains other analysis algorithms. The level of confidentiality provided by the differential privacy can be set by the input and output keys of the resulting trained algorithm FIG. 7 depicts a system diagram 700 illustrating an obfuscated algorithm processing plaintext data in accordance with embodiments of the present disclosure. FIG. 7 further depicts a plaintext algorithm that has been converted into an obfuscated algorithm 704. The algorithm takes plaintext 702 as input. The plaintext is then sequentially processed by at least one operation block. In the example embodiment, algorithm 704 is implemented with three blocks, 706, 708 and 710. Each block behaves the same way and performs a single instruction multiple data (SIMD) operation. Block 706 takes the plaintext input 702 and produces an output. This output is then processed by another single instruction multiple data operation 708 to produce an output. This output is in turn processed by a similar block 710. The output of block 710 is the plaintext algorithm output 712. Each SIMD operation looks almost identical to each other. All operations seem identical to any forensic process. The inputs and outputs of each block are configured to handle at least one input data point. The algorithm can be implemented in a high level language as described above or in a compiled machine code. For a given algorithm, the block representation is not unique.

Each block operation may be performed on a least one processing unit. While the most obvious embodiment uses a single processing unit to perform all block operations, in another embodiment each block being performed on separate processing units. The multi-processing unit system can be configured to provide a pipeline architecture such as available in multicore processors or distributed cloud computing.

Figure 8:
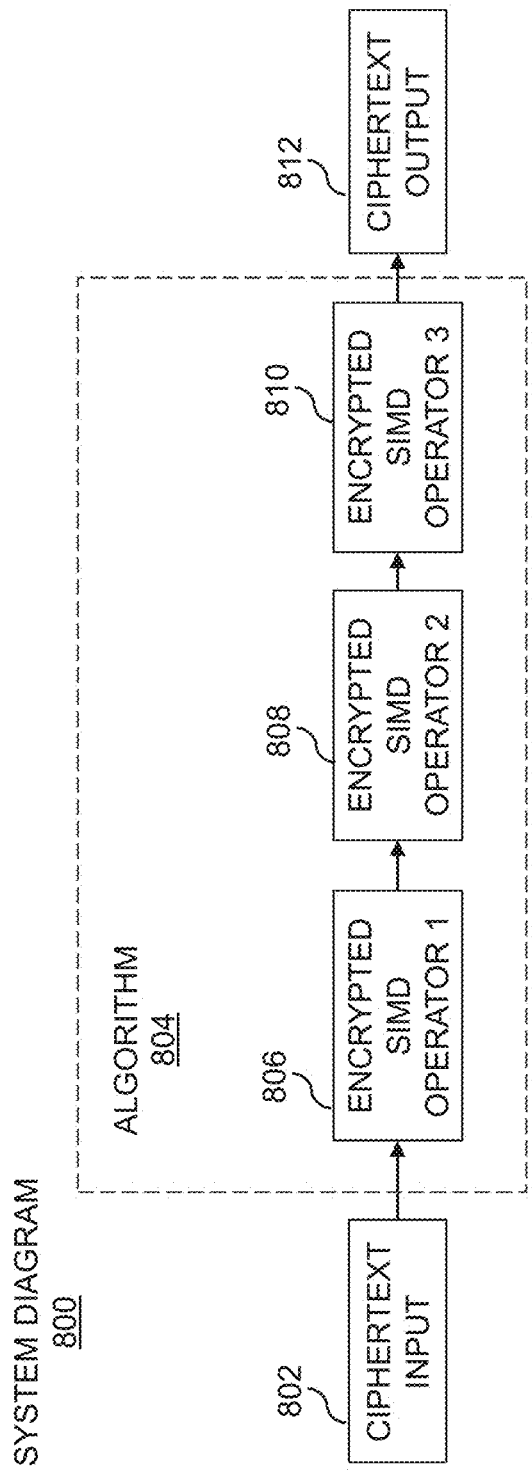
FIG. 8 depicts a system diagram illustrating an encrypted obfuscated algorithm processing ciphertext data in accordance with embodiments of the present disclosure.

FIG. 8 depicts a system diagram 800 illustrating an encrypted obfuscated algorithm 804 processing cyphertext data in accordance with embodiments of the present disclosure. The encrypted obfuscated algorithm 804 is composed of three blocks of encrypted SIMD operations. A ciphertext input 802 is generated from a plaintext source and is described in more detail in FIG. 1. This ciphertext may have already been authenticated and properly encrypted to be processed by algorithm 804. The source of the ciphertext input 802 may be an embedded platform, a computer readable memory, a streaming device such as a phone, computer, TV, heart monitor, stock price monitor, blockchain transaction mining, automated teller machine, social media monitor, or network device. Each ciphertext input 802 contains at least one element of information to be processed.

End-to End

In the case of an end-to-end encryption, only the source of the encrypted message 802 knows the encryption key, and only the recipient of the ciphertext output 812 is aware of the decryption key. The source and the recipient may be different or identical. In an embodiment, the algorithm may have multiple ciphertext outputs 812 that are targeted to different recipients. Each will have a different decryption key.

The decomposition of an algorithm 804 into encrypted SIMD blocks is not unique even for fixed encryption or decryption keys of a given ciphertext 802 input or ciphertext output 812. The encrypted SIMD operations 806, 808 and 810 operate on encrypted data without decryption and are implemented using similar block as standard SIMD operations.

Legacy Hardware

To provide full obfuscation and encryption using legacy hardware that simulate the SIMD operation such as function, the implementation of operator 806, 808 and 810 may be based on functions, sub-functions, or macros using an existing high level language, e.g., C++, python or tensorflow. Some of the parameters such as vector size may be hard coded to prevent information leakage. They can also be compiled into machine code, intermediate code or even flashed into FPGA or other physical medium, including quantum computers.

Functional Encryption-Decryption Key—Cripple Ware

In another embodiment, the behavior of algorithm 804 may be based on the type of encryption key used to generate the ciphertext input 802. For example, a specific functionality of the program may be disabled. For example, a crippleware key may be released to let a given user try an algorithm that detects and identifies defects of parts that are moving on an assembly line. The crippling key only provides a binary defective/not defective result, while the full feature key provides also the detailed report on the type and location of the defect. In another embodiment, the crippling key may be associated with the decryption of the output 814. In either embodiment, the algorithm 804 and the obfuscation key that generated SIMD blocks can operate on the full feature or crippling keys.

In another embodiment, multiple obfuscation keys may be created to perform the same type of operation, but provide different outputs. For example one obfuscation key provides very accurate results with high resolution. A second obfuscation key may provide less accurate results with a lower resolution. For example, the first obfuscation key processes images at 4 k color resolution while the second obfuscation key processes images as a grayscale 128×128 pixel image. Another embodiment of this behavior is also discussed in the section regarding differential privacy.

In another embodiment, a deobfuscation key is also provided in order to decrypt at least one encrypted SIMD operation, encrypted block input, or encrypted block output. An example application for this configuration is a court allowing the release of the encryption key to a law enforcement agency. To be active, this key may require physical access to the hardware that performs the operation or temporarily stores the encrypted inputs or outputs. Additionally, the deobfuscation key may be broken into at least two partial keys that are required to generate the obfuscation key. The partial keys may be held by separate trusted parties that may require a special protocol to release the corresponding partial key. This key protocol may include the ability to be used for a limited number of times, for a limited duration, and a limited type of hardware. For a configuration where non-volatile storage or transmission of temporary data is needed during the encrypted block processing, an additional encryption protocol may be added to further protect such transmission or storage. This additional layer of encryption is not needed as the data is encrypted. However, it may be necessary to protect against potential wrongful use of the deobfuscation key. This additional layer may also include encryption such as public-private key system, such as RSA, but also learning with error (LWE) and encryption associated with homomorphic encryption methods. The target of the ciphertext output 804 may be an embedded device, computer device, memory, transmission device. The input and output of each encrypted SIMD block 806, 808, 810 may be stored into volatile or non-volatile memory, transmitted to or from a transmission device such as a network card, or other physical medium.

Each block within 804 may be performed on a least one processing unit. While the most obvious embodiment uses a single processing unit to perform all block operations, in another embodiment each block is being performed on separate processing units. The multi-processing unit system may be configured to provide a pipeline architecture such as is available in multicore processors or distributed cloud computing. As the encryption of ciphertext 802 is designed to match the encrypted algorithm 804 and no key is needed to process operations 806, 808, and 810.

The target of the ciphertext output 804 may be an embedded device, computer device, memory, transmission device. The input and output of each encrypted SIMD block 806, 808, 810 may be stored into volatile or non-volatile memory, transmitted to or from a transmission device such as a network card, and/or other physical medium.

Figure 9:
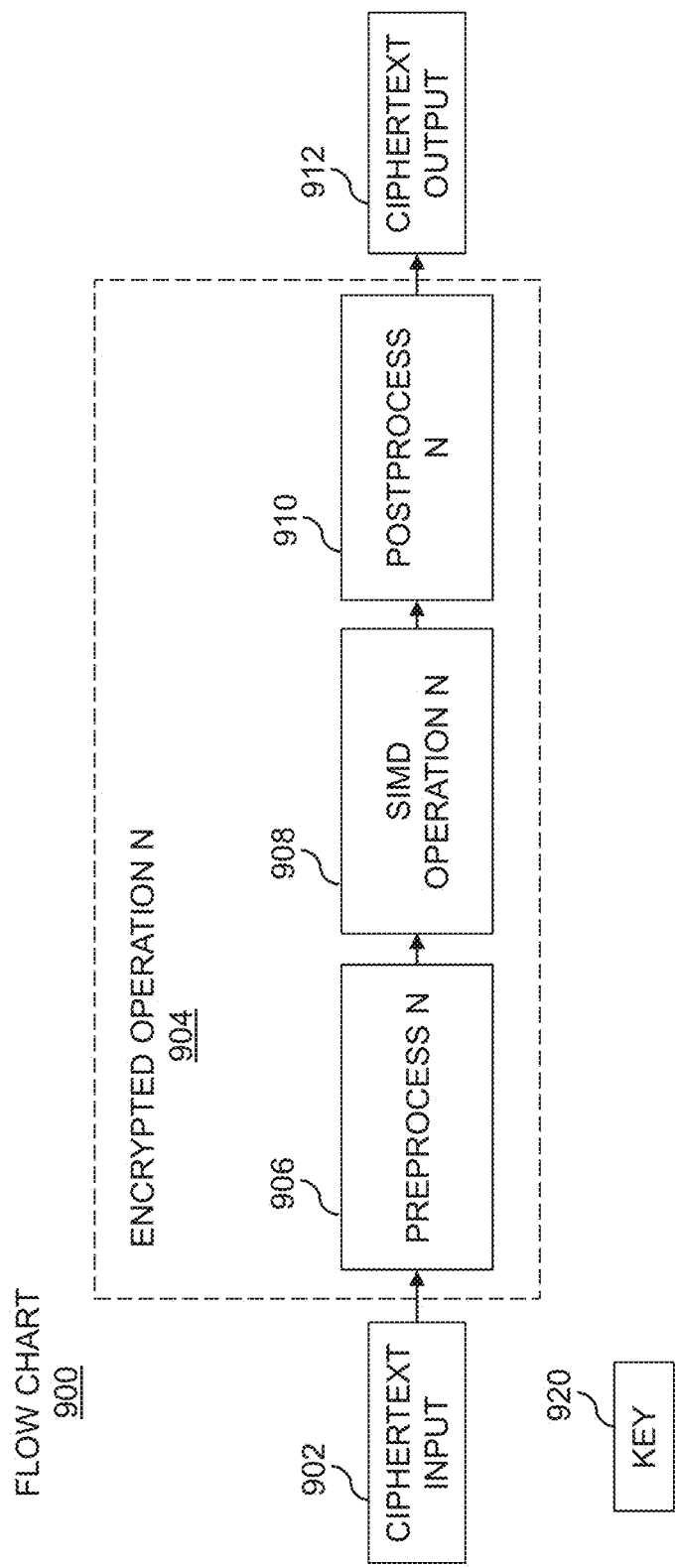
FIG. 9 depicts a flowchart illustrating an outcome of a single instruction multiple data (SIMD) operation conversion into an encrypted SIMD operation in accordance with embodiments of the present disclosure.

FIG. 9 depicts a flowchart 900 illustrating an outcome of an SIMD operation 908 conversion into an encrypted SIMD operation 904 in accordance with embodiments of the present disclosure. The encrypted SIMD operation 904 corresponds to the Nth operation performed on an obfuscated algorithm as shown in FIG. 8. The encrypted operation 904 has the same functionalities as the SIMD operation 908. However, 904 operates on an encrypted version of the input for 908. The method of the conversion is to insert a pre-process step 906 before each operation 908 and append a post-process step 910 after the operation block, as long as the post-process of operation N corresponds to the inverse of the pre-process of the following operation N+1. For the first operation, the pre-process of operation 1 must match the decryption of the input ciphertext. For the final operation, the post-process must match the decryption of the algorithm output. To avoid release of any encryption and decryption keys the post-process N, pre-process N+1 and the SIMD operation are fully compatible. An embodiment of such a method is for SIMD operations that are linear operations, such as matrix multiplies. In this case, the pre-process and post-process are also matrix multiplies, the combined encryption SIMD operation is a unique matrix multiply, and the new matrix is the result of three matrix multiplies. This embodiment works provided that the matrix representing postprocess N and the matrix of the following preprocess will provide an invertible or generalized inversion on a projected space. The encryption key of the obfuscated algorithm 920 is the set of matrices. As discussed earlier, for end-to-end encryption there is no need to store this key as the pre and post processes cancel each other. If the key is kept it could be used as a way to attack the encryption. An example of implementation is described in Equation (2) and example of updating the encryption operators is described in equation (3). In some embodiments, these pre-process and post-process steps may include authentication, verification, certification, or an error correction step to protect integrity of the computation and data. While the keys are not needed for the intermediate steps, the first pre-process key and last post-process key can be stored within the framework of the obfuscation key for validation purposes.

The pre-process and post process operation can be performed on a standard addition/multiplication operation on R or Z, but also on Zq and other fields that provide additional encryption in order to be consistent with the input ciphertext operation. This consistency can be based on the homomorphic encryption of data using LWE.

Figure 10:
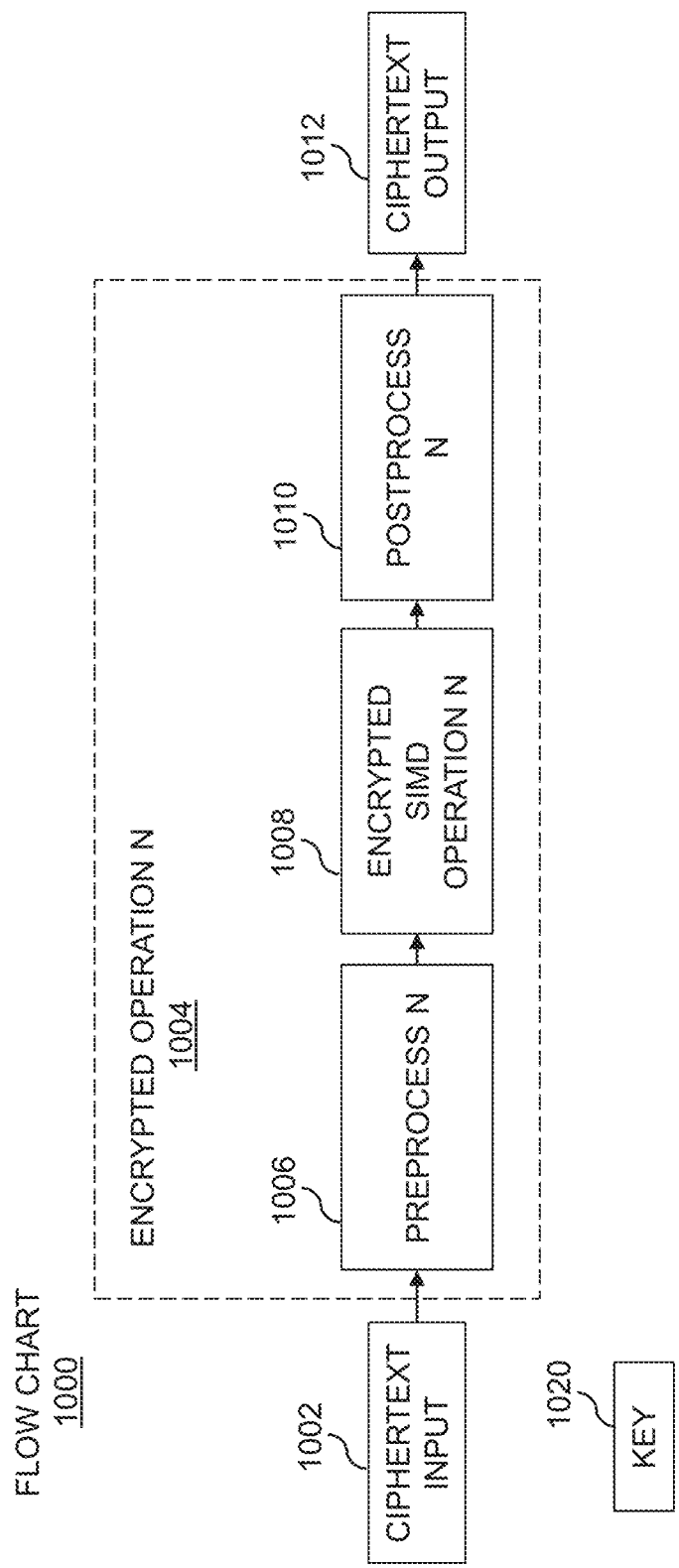
FIG. 10 depicts a flowchart illustrating an encrypted SIMD operation that is further encrypted using a new key in accordance with embodiments of the present disclosure.

FIG. 10 depicts a flowchart 1000 illustrating an encrypted SIMD operation that is further encrypted using a new key in accordance with embodiments of the present disclosure. This step is very similar to the operation described FIG. 9, as long as the new post-process N 1010 inverts or pseudo inverts the new pre-process of operation N+1. To prevent round off error, the implementation may be done on integer arithmetic or higher order polynomial based fields. The new encrypted algorithm N 1004 will also have an obfuscation key 1020 that is computed based on the prior key 920. This key is not needed for intermediate steps of decryption of ciphertext 1002 and 1012 are not required. The pre-process 1006 and post-process 1010 can be very similar to pre-process 906 and post-process 910 and may include certification, authentication, verification, and error correction.

Since this method does not require the plaintext obfuscated algorithm to create new encrypted obfuscated algorithms, this methods provides a different approach to distribute new algorithm for embedded platforms or cloud computing. It is then possible to have a different encrypted obfuscated algorithm for every single mobile device or cloud computation platform while still retaining the same keys for the input ciphertext and output ciphertext. It provides an ability to decouple the key distribution between program obfuscation keys and data encryption and decryption keys.

Figure 11:
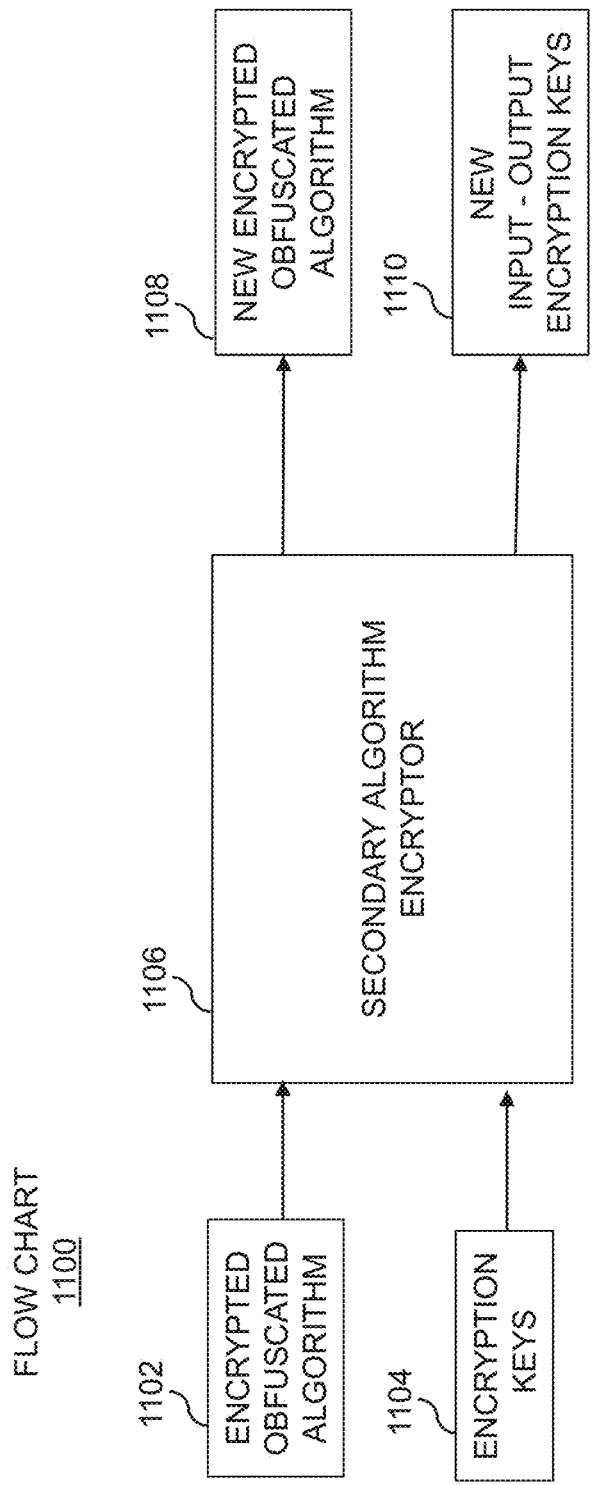
FIG. 11 depicts a flowchart illustrating a creation of a new encrypted obfuscated algorithm based on an existing encrypted obfuscated algorithm in accordance with embodiments of the present disclosure.

FIG. 11 depicts a flowchart 1100 illustrating a creation of a new encrypted obfuscated algorithm based on an existing encrypted obfuscated algorithm 1102 in accordance with embodiments of the present disclosure. In this configuration, the encryption keys 1104 may be required to implement the steps described in FIG. 10. The source of the encrypted obfuscated algorithm 1102 may be a computer, a machine readable set of instruction, a set of compiled instructions, etc. The source of encryption keys 1104 may be a machine readable device, ram, or the like. These keys may be protected by an additional public-private key system. The method to convert the algorithm 1102 can be implemented on a device similar to the encryptor describe in FIG. 10. As described in the method above the new encrypted obfuscated algorithm 1108 is generated and can be stored as plaintext, machine code, high level language program plaintext. And, the corresponding input-output key 1110 can be generated. They can be stored as bits, qbits, integers, characters, on a machine readable support. The key in 1110 may also include deobfuscation keys if needed. The operation provided by 1106 may be performed on a computer, embedded platform, etc.

Figure 12:
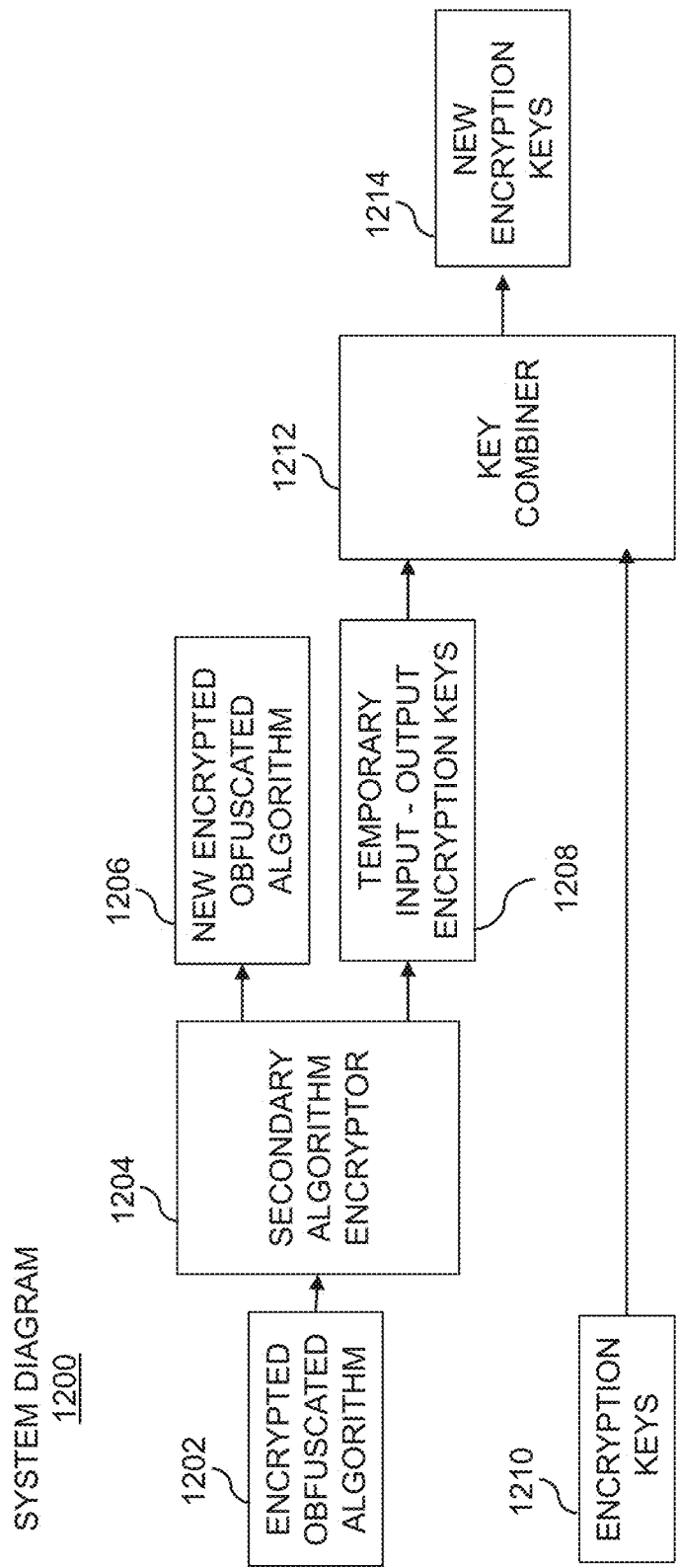
FIG. 12 depicts a system diagram illustrating a decoupling of the re-encryption of the obfuscated algorithm from the encryption key in accordance with embodiments of the present disclosure.

A drawback of the generation of a new obfuscated algorithm is the need to release the information regarding the encryption and decryption keys to the obfuscation process. FIG. 12 depicts a system diagram 1200 illustrating a decoupling of the re-encryption of the obfuscated algorithm 1202 from the encryption key 1210 in accordance with embodiments of the present disclosure. In this embodiment, the method 1204 that creates the new encrypted obfuscated algorithm also creates temporary input-output encryption/decryption keys 1208. A key combiner 1212 take the temporary keys 1218 and the original encryption key 1210 and creates a new set of input-output encryption keys 1214 that will be consistent with the new encrypted obfuscated algorithm 1206. Ideally, the method 1204 and method 1212 should be on different processing units but it is not required. The new keys 1214 must be carefully protected if they must be transmitted to other parties.

An embodiment of the method described in FIG. 12 would be a server that periodically updates encrypted obfuscated algorithms to a remote location to prevent potential theft. Another application is a server 1204 that provides temporary encryption and decryption keys to enable additional encrypted input streams. In this configuration the key combiner 1212 could be implemented into the device that stores the encryption keys.

In an embodiment of the new key generation as shown in FIG. 12, an algorithm developer releases an obfuscated encrypted algorithm to an online application store. The first time a customer downloads the algorithm, the application store generates a set of keys that are unique to the customer and creates a new encrypted algorithm. For security reason, the application store does not retain the customer keys. When the keys need to be updated, the application store re-encrypts the algorithm, generates temporary keys, and sends them to the customer. The keys are updated on the customer's mobile device. This provides the ability to cache updates of encrypted obfuscated algorithms on the application store servers. It also allows the ability to provide an end-to-end algorithm distribution where none of the keys are known to third parties, i.e., the data encryption key is kept only by the source of the plaintext input data, the algorithm encryption key is known only to the owner of the plain text algorithm, and the decryption key is known to the receiver of the plaintext output data.

The system is very portable as it provides the ability to create a master encrypted obfuscated algorithm and generate many sub-master encrypted obfuscated algorithms to be able to target different software platforms, e.g., iOS, Android, and hardware platforms.

Figure 13:
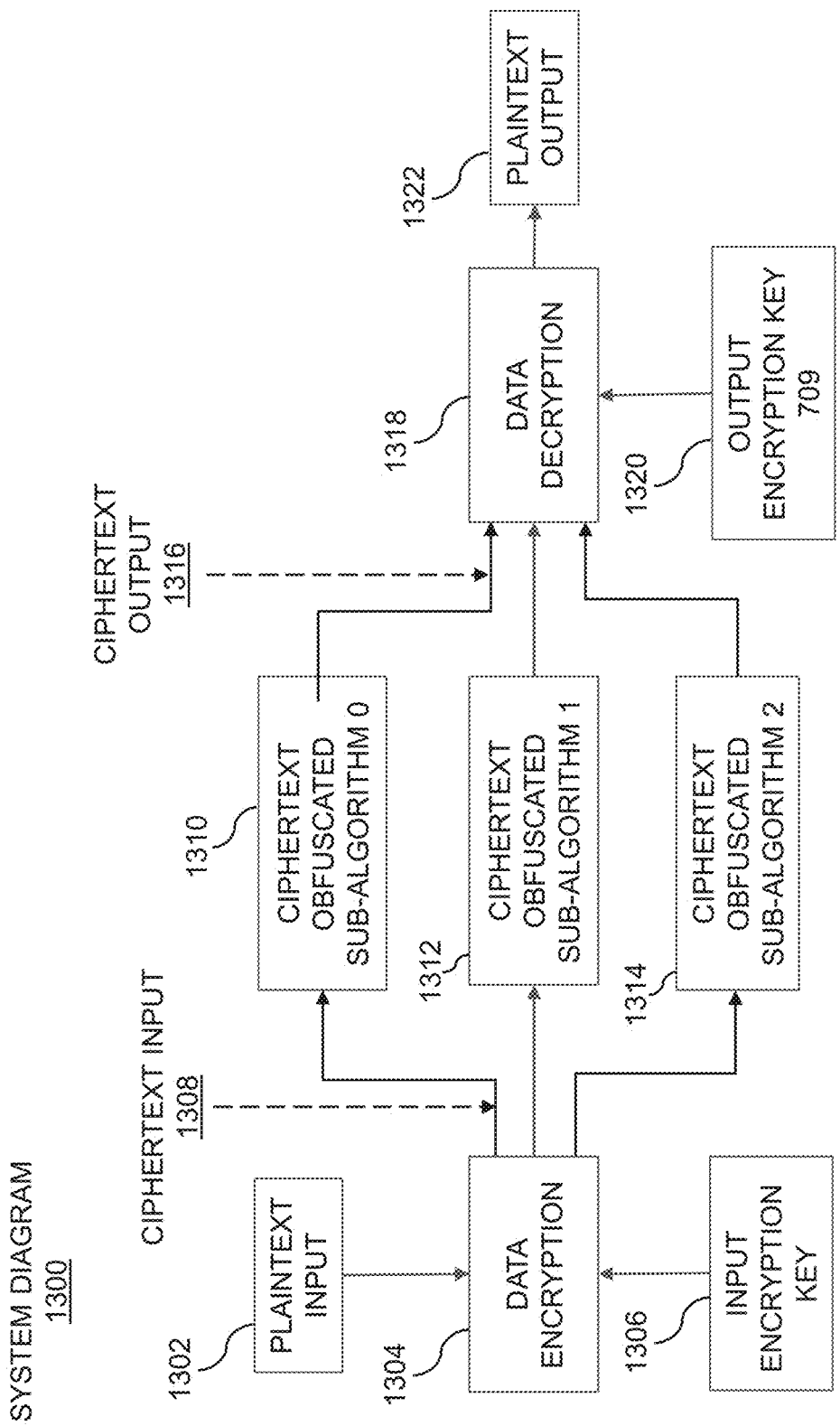
FIG. 13 depicts a system diagram illustrating an algorithm split into parallel algorithms in accordance with embodiments of the present disclosure.

FIG. 13 depicts a system diagram 1300 illustrating an algorithm split into parallel algorithms in accordance with embodiments of the present disclosure. A source of plaintext 1302 is encrypted by a data encryption device 804 using a input encryption key 1306. The ciphertext 1308 serves as input to three encrypted obfuscated sub-algorithms, items 1310, 1312 and 1314. The input of each of these algorithm may be the full ciphertext 1308 or only a subset of the elements that constitute the ciphertext. The resulting ciphertexts are then combined into a single ciphertext 1316 that is subsequently decrypted by a data decryption operation 1318 using an output decryption key 1320. The resulting plaintext output 1322 is designed to be identical to the original plaintext algorithm. In this configuration the sub-algorithm may be performed on one or more cloud computing platforms, embedded systems, or mobile devices. Since the obfuscation allows vectorized and parallel access to data, the transfer to a parallel process is made easily.

In one embodiment, the data may be forwarded to different cloud computing processing units in order to optimize the computation cost. In another embodiment, to maximize computer resources, the parallel implementation of the algorithm could be distributed on several computer cores or graphics cards that are available on a PC. The configuration could be determined by changing the key that is attributed to the data encryption and or the algorithm encryption and obfuscation. Depending on the location of the processors, the output of each block can be further encrypted on the fly to prevent memory leak.

In other embodiments, the parallelization can be performed at any step of the algorithm SIMD algorithm. A merging operation may also be performed as an SIMD operation, as the merge operation can be performed as part of the "data augmentation" step of the SIMD operation as discussed element 1502 of FIG. 15.

FIG. 13 may be generalized to include multiple plaintext inputs where each is encrypted. The encryption keys may be different for each of the inputs. Similarly the decryption may also be distributed to multiple plaintext output.

An embodiment of the multiple plaintext input and multiple plaintext output may be in the financial industry where a customer has several accounts across multiple banks or investment firms. In order be qualified for a line of credit, the customer must disclose his assets to a broker that then queries multiple loan institutions to determine the best credit option. The disclosed method and system allows the encryption of the bank asset information, transmit them to the third-party without risk of disclosing any specifics to the third party. The aggregated financial asset information is also kept hidden from the loan institutions that do not need to decrypt the customer asset information. Each loan institution has its own algorithm that is run in parallel. The results can then processed by the broker to determine the best option. During this entire process the customer asset information is kept encrypted and is never decrypted. Only the final result is decrypted by the customer.

Figure 14:
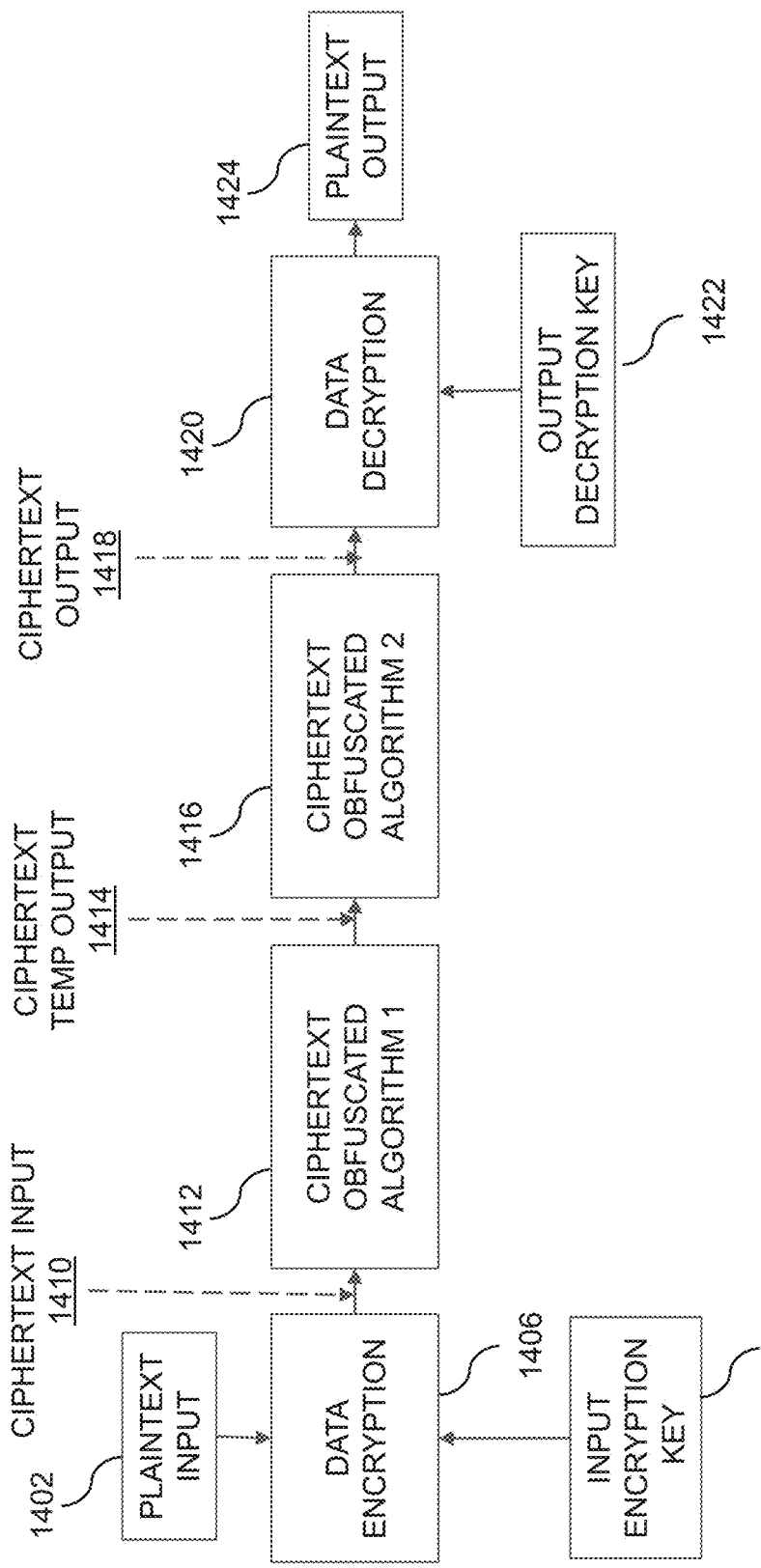
FIG. 14 depicts a system diagram illustrating a chained encrypted obfuscated algorithms without the need decrypt and re-encrypt the output in accordance with embodiments of the present disclosure.

FIG. 14 depicts a system diagram 1400 illustrating a chained encrypted obfuscated algorithms without the need decrypt and re-encrypt the output in accordance with embodiments of the present disclosure. Plaintext input 1402 is encrypted by data encryption 1406 using input encryption key 1408. The resulting ciphertext input 1410 is the input to ciphertext obfuscated algorithm 1412 that matches encryption key 1408. The output of 1412 is ciphertext temp output 1414. Instead of forwarding this output to an end user for decryption, output 1414 serves as input to ciphertext obfuscated algorithm 1418 which creates ciphertext output 1418 without decryption of output 1414. Ciphertext 1418 is then decrypted by block 1420 using output decryption key 1422 to create resulting plaintext output 1424. This chaining of obfuscated algorithms without decryption is easily scalable to more algorithms.

Figure 15:
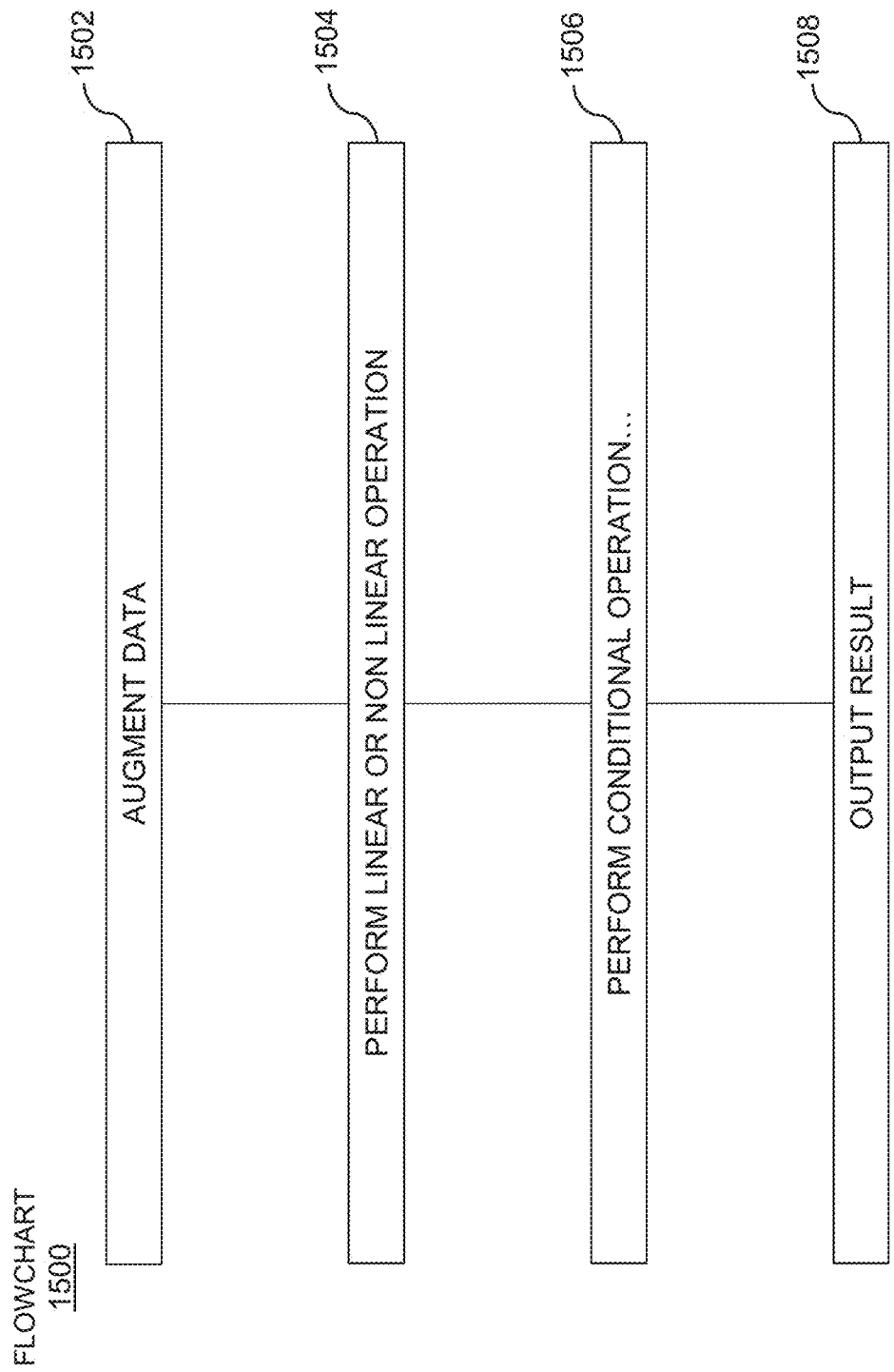
FIG. 15 depicts a flow chart illustrating an SIMD operation that is a building block of obfuscated algorithms and encrypted obfuscated algorithms in accordance with embodiments of the present disclosure.

FIG. 15 depicts a flow chart 1500 illustrating an SIMD operation that is a building block of obfuscated algorithms and encrypted obfuscated algorithms in accordance with embodiments of the present disclosure. Each of these blocks include four steps. First, the augment data step 1502 transforms the multiple data inputs by increasing the number of data elements in each individual entry. The additional elements may be random numbers, constants values such as zero or one, replication of original elements that is processed by a linear or nonlinear transformation, or a deterministic sequence of values. Examples of such transformations are described in Equations (5) and (6).

Second, the perform linear or non-linear operation step 1504 combines the augmented multiple data created in 1502 into a new multiple data element. One most common operation is equivalent to a vector element multiply or other linear tensor operation as shown in equation (1). Nonlinear operations such radial basis, trigonometric, or logarithmic functions can also be added to the operation. The number of elements in the newly created multiple data may increase, decrease or remain the same. The linear operation may be performed as standard element wise addition and multiplications. The coefficients associated with the linear combination or the type of the nonlinear operation are specified by the obfuscation key that is created during the generation of this block as shown in Equation (2).

Third, the perform conditional operation step 1506 takes the results of 1504 and applies a projection or conditional operation based on at least one threshold. The projection space tensor and the threshold values are specified by the obfuscation key.

Fourth, the output of the conditional operation is then processed to be released to the next SIMD operation building block of final output by step 1508. In most typical embodiments, the result of 1506 is directly made available. To increase the complexity of the encrypted obfuscation, step 1508 may also include an augmentation step similar to 1502 and a linear or nonlinear operation step similar to 1504. These additional steps may use parameters that are different from steps 1502 and 1504. During output result step 1508, additional information may be added to provide authentication, verification, or error control of the data. For some configurations, the data may be further encrypted. In these configurations the next operation will have a decryption step in the 1502 step. This operation may be particularly useful in order to protect the encrypted data from deobfuscation, as it adds another level of security to the building block.

In some embodiments, the flow chart 1500 includes a global counter that is incremented when at least one of the steps described above are performed. The value of the increment is typically 1 but may be changed to take into account the complexity of the operation. This counter is also encrypted to prevent tampering. The value of the counter may be added to the output during step 1506. In some embodiments, this counter can be used to verify computation. This counter can be used to provide a payment infrastructure for computation providers.

Each step 1502, 1504, 1506, 1508 may also include the insertion of hash elements to provide verification and authentication. Flow chart 1500 can be implemented as a single operation on a computation hardware or as FPGA IP masks, or as an Application Programming Interface (API) to a high level language.

Figure 16:
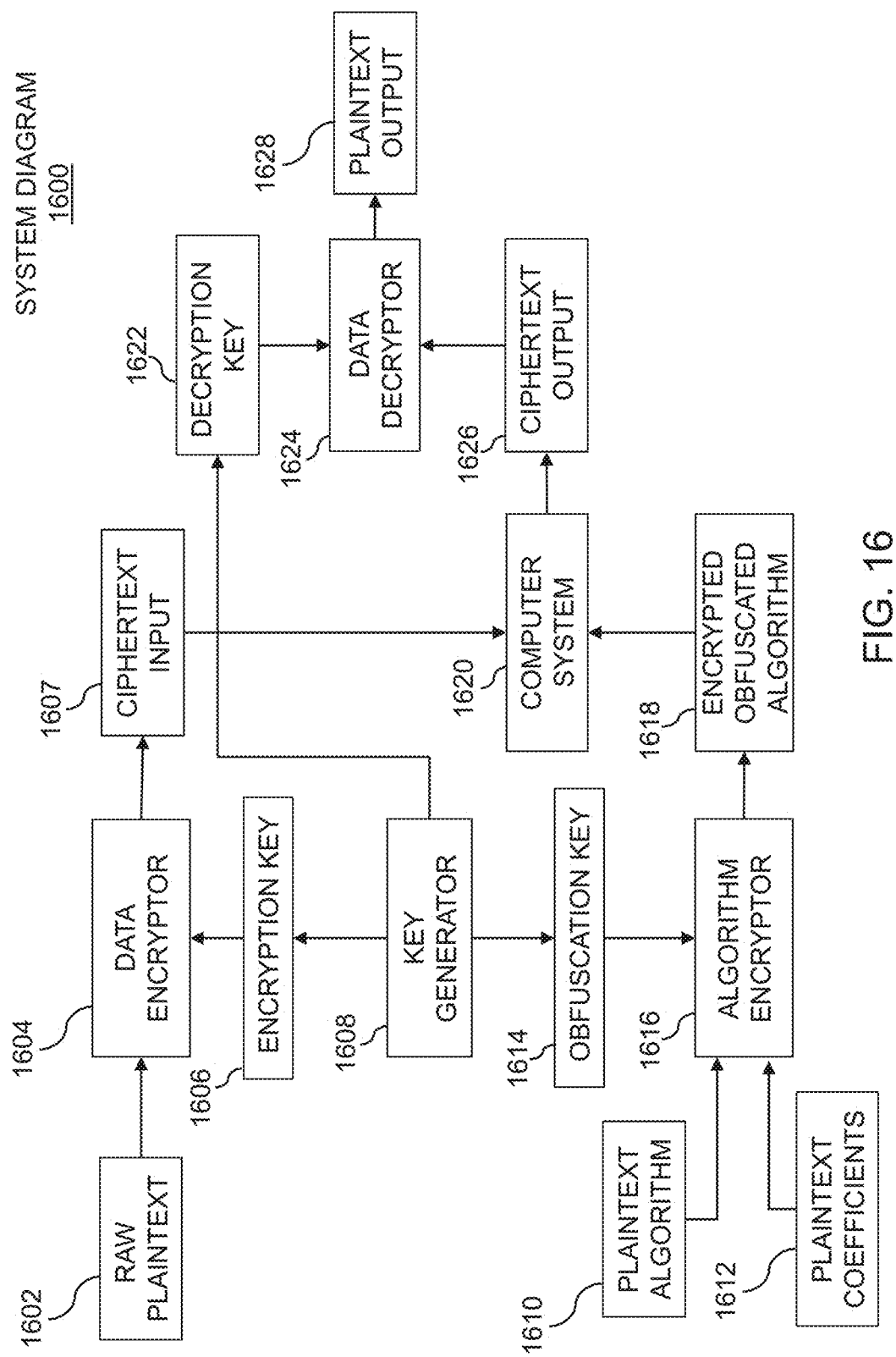
FIG. 16 depicts a system diagram illustrating compiler and executable components for the encrypted obfuscated implementation of an algorithm in accordance with embodiments of the present disclosure.

FIG. 16 depicts a system diagram 1600 illustrating compiler and executable components for the encrypted obfuscated implementation of an algorithm in accordance with embodiments of the present disclosure. FIG. 16 further illustrates a block diagram of the system 1600 that represents a full system that takes in both plaintext data and a corresponding algorithm as inputs, obfuscates and encrypts, and outputs and subsequently decrypts ciphertext into plaintext output.

The raw form of plaintext 1602 is initially fed into a data encryptor 1604. The data encryption process may include a vectorization method that converts the raw plaintext into operable data. The raw plaintext may be stored as bits, quantum bits, integers, fixed point, floating point real numbers, complex numbers, quaternions, characters, or strings. The operable data is then encrypted using the data encryption key 1606 generated by the key generator 1608. The data encryptor 1604 may be a computer that converts the plaintext into ciphertext 1607. This ciphertext 1607 is used an input into the computer system 1620. The computer system may be a personal computer, a workstation, a laptop, a tablet, a smartphone, a smart watch, and an Internet-of-Things device, or the like.

The plaintext algorithm 1610 and its corresponding coefficients 1612 are input into the algorithm encryptor 1616. The source of the algorithm 1610 can be an active device, a readable device, a computer that provides a list of instructions such as uncompiled plaintext code written in a computer language, e.g., python, C++, Java, JavaScript, Lua, Matlab, PhP, Perl, Julia, CUDA, R, SAS, Objective C, Swift, OpenGL, C#, Fortran, Clojure, Kotlin, Haskel, Tensorflow, Keras, and the like. The source of the algorithm can also be compiled code, intermediate code representation, binary code generated via a compiler, or circuit or random access machine code. The source of the coefficients 1612 may be a computer, a readable device, or a memory storage device. The coefficients may be stored as bits, quantum bits, integers, fixed point, floating point real numbers, complex numbers, quaternions, characters, or strings. These coefficients may be fully integrated into the plaintext algorithm 1610. Even if they are independent, the sources of the algorithm 1610 and the coefficients 1612 may be identical.

The algorithm encryptor 1616 may include an operation obfuscator which outputs a sequence of operations. The obfuscator is detailed in FIG. 1, and may be a computer that converts the operations into a sequence of simple instructions. These instructions take multiple inputs and first repackage them as vectors, matrices, or tensors, then augment the resulting vectors, matrices, or tensors, and finally apply a linear operation followed by nonlinear operation. The result is a plaintext obfuscated algorithm where all the instructions appear identical in the program and the coefficients are fixed, parameterized, or hard coded. The algorithm conversion can also be performed by an automated program such as a compiler.

The obfuscated algorithm may be implemented as another uncompiled plaintext code, compiled code, intermediate code, or binary code, etc. If the format is uncompiled plaintext code, the language may be different than the plaintext algorithm 1610. The plaintext obfuscated algorithm serves as input to the subsequent blockwise encryptor. The sequence of obfuscated operations is encrypted by the algorithm obfuscation and encryption key 1614 created by the key generator 1608. The obfuscation and encryption steps in the algorithm encryptor 1616 may be performed in a single operation. The output encrypted obfuscated algorithm 1618 may be plaintext computer code, compiled code, or encrypted code for further distribution.

The data and algorithm encryption key generator 1608 creates keys for both the data encryption 1604 and obfuscated algorithm encryption 1616. The data and algorithm encryption key generator 1608, the data encryptor 1604, and the algorithm obfuscator and encryptor 1616 may be hosted on a cloud computing system, a mobile device, a laptop, a desktop, a quantum computer, a local server or a remote server. Each operator may be on the same or different system.

The resulting ciphertext from the data encryptor 1604 and encrypted obfuscated algorithm output from 1616 are transmitted separately to the computation system 1620. The computation system 1620 applies the encrypted obfuscated algorithm 1618 to the ciphertext input 1607, giving ciphertext 1626 as output. The output ciphertext 1626 may be stored as bits, quantum bits, integers, fixed point, floating point real numbers, complex numbers, quaternions, characters, or strings. The output ciphertext 1626 is decrypted by the data decryptor 1624, resulting in plaintext readable output 1628. The data decryptor 1624 uses a decryption key created by the key generator 1608. The computer system 1620 and data decryption 1624 may be hosted on a cloud computing system, a mobile device, a laptop, a desktop, a local server or a remote server. Each operator may be on the same or different system.

One embodiment of the full system is an encrypted database query and subsequent function application. A large social media company may keep user data in a large database but also allow third-party developers access to its platform for application development and usage. In order to protect user data, the company can encrypt the database with a single master key, and then distribute keys to the third party developers, allowing them to access and query the database without seeing any of the actual user data. With their own keys, the developers can restrict the social media company from seeing what the query parameters are and the subsequent function being performed on the data. To further protect the anonymity of the query and database, the response to a query to a given social media may be partially randomized to provide differential encryption. The level of anonymization or amount of randomization may be provided by the key or its metadata. This method is intended to prevent a third party to infer information from the social media database based on repetitive queries. Likewise, the third party developer encryption may also randomize their query to prevent the social media company to infer information based on the queries. This level of randomization may also be set by the obfuscation and or encryption key and/or its metadata.

Another embodiment is the creation and computation of a contract program or transaction within a distributed or centralized bock chain such as bitcoin or Ethereum or direct acyclic graph crypto currency such as IOTA or byteball. In these systems, the transaction or contract is authenticated but not encrypted. Since any Turing-complete algorithm can be converted into an encrypted obfuscated algorithm, the transaction or contract can be converted into encrypted obfuscated algorithm, where only authorized entities may be allowed to decrypt the inputs and outputs of the transactions.

In another embodiment, the encrypted obfuscated algorithm is a plaintext program in a high level language such as C, C++, Python that prevents unencrypted data prefetch when compiled into machine code. The SIMD output of the encrypted obfuscated program makes it immune to side channel attacks such as SPECTRE that can access prefetch information before encryption.

FIG. 17 depicts a system diagram 1700 illustrating an SIMD operation block system that is configured by a block configuration key 1702 in accordance with embodiments of the present disclosure. The block configuration key 1702 is the obfuscation key or can be derived from the obfuscation key. The derivation of key 1702 can be obtained by a public/private key protocol, by subkey generation, other standard subkey generation. Input of the SIMD block 1704 is encrypted. Operations of block 1706 include at least one of tensor operation 1708, nonlinear operation 1710, conditional operation 1712, output operation 1714, and random number generation 1716. Computed output 1718 is by definition encrypted. The operation can be performed without decryption of input data 1704. Encrypted input data 1704 may be a number, a vector, or a tensor from a multi-dimensional space generated from a linear space such as the set of real numbers, complex numbers, quaternions, from a cyclic group, from a ring of polynomials over a finite field, from a ring of polynomials modulo a polynomial, or other field that can provide additions and multiplications. The field may be determined a priori or can be determined by the key 1702. Random number generator 1716 can be added to 1706 to provide additional noise during each operation, i.e., 1708, 1710, 1712 and 1714. The noise characteristics include distribution type, mean, standard deviation and can be set a priori or by key 1702. Random number generation 1716 can be performed a physical random generator such as diode, wide band photonic entropy source such as chaotic lasers, a pre-recorded physical random event source. Random number generation 1716 can also be a produced by a pseudo random number generator, where the seed is derived by key 1702. As in FIG. 17, tensor operation 1708 includes matrix multiply or other tensor operation where a random number can be added or multiplied at each operation or only at selected location. The configuration of tensor operation 1708 is established by key 1702. Tensor operation 1708 also includes data augmentation that includes fixed number insertion where the numbers are generated by random generator 1716. Non-linear operation 1710 provides element-wise non-linear operations that augment data. For example each element of a tensor input can lead to the creation several nonlinear version of each element, e.g., element $x_i$ produces $x_i$ and $x_i^2$.

Conditional operation 1712 provides the ability to create at least two tensor values each corresponding to a condition based on a linear or non-linear comparison to multiple thresholds. The comparisons and thresholds can be set a priori or configured directly or indirectly from key 1702. The comparison in 1712 can also include random elements from generation 1716. Comparison can be based on an ordered space, a tiled multidimensional space, or on a cardinal space. Output operation 1714 can be set a priori or can be configured by key 1702. During output operation 1716, additional information may be added to provide authentication, verification, or error control of the data. For some configurations, the data may be further encrypted. The order and the number of operations performed within each block are determined a priori or can be determined from key 1702. Overall output 1718 is an encrypted data set that can serve as input to at least one of another SIMD block, final system output.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, SAS, Tensorflow, CUDA, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create an ability for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
  receiving one or more obfuscated and encrypted program instructions that implement an obfuscated and encrypted algorithm having fixed obfuscated and encrypted coefficients, wherein:
    the one or more obfuscated and encrypted program instructions are configured for:
      receiving one or more ciphertext input data;
      providing one or more ciphertext output data; and
      implementing obfuscated and encrypted versions of one or more plaintext program instructions that implement a plaintext algorithm having fixed plaintext coefficients; wherein:
        the one or more plaintext program instructions are configured for:
          receiving one or more plaintext input data; and providing one or more plaintext output data;
the one or more ciphertext input data is an encrypted version of the one or more plaintext input data; and
the one or more ciphertext output data is an encrypted version of the one or more plaintext output data;
and
the one or more obfuscated and encrypted program instructions are an encrypted version of the one or more plaintext program instructions using one or more program instruction encryption keys;
receiving one or more program instruction encryption update keys, wherein:
the one or more program instruction encryption update keys are configured for updating the one or more obfuscated and encrypted program instructions into one or more updated obfuscated and encrypted program instructions for updating and securing the plaintext algorithm, or obfuscated and encrypted algorithm;
the one or more updated obfuscated and encrypted program instructions are configured for:
receiving one or more updated ciphertext input data; and
producing one or more updated ciphertext output data, wherein the one or more updated ciphertext input data is an encrypted version of the one or more plaintext input data;
and
the one or more updated ciphertext output data is an encrypted version of the one or more plaintext input data;
executing an update operation on the obfuscated and encrypted instructions using the one or more program instruction encryption update keys to create one or more updated obfuscated and encrypted instructions, wherein:
the one or more updated obfuscated and encrypted instructions comprise fixed updated obfuscated and encrypted coefficients; and
the fixed updated obfuscated and encrypted coefficients are configured for implementing an updated obfuscated and encrypted version of the plaintext algorithm;
and
storing the fixed updated obfuscated and encrypted coefficients.

2. The computer implemented method of claim 1, wherein the one or more program instruction encryption update keys are transmitted from a server using an authentication and encryption protocol.

3. The computer implemented method of claim 1, further comprising receiving one or more input data encryption keys, wherein the input data encryption keys are configured to secure the one or more plaintext input data and create the one or more ciphertext input data from the one or more plaintext input data.

4. The computer implemented method of claim 3, further comprising receiving one or more input data encryption update keys, wherein:
the one or more input data encryption update keys are configured to create one or more new input data encryption keys from the one or more input data encryption keys; and
the new input data encryption keys are configured to create the one or more updated ciphertext input data from the one or more plaintext input data.

5. The computer implemented method of claim 1, further comprising receiving one or more input data update encryption keys, wherein the input data update encryption keys are configured to create the one or more updated ciphertext input data from the one or more ciphertext input data.

6. The computer implemented method of claim 1, further comprising receiving one or more output data decryption keys, wherein the output data decryption keys are configured to create the one or more plaintext output data from the one or more ciphertext output data.

7. The computer implemented method of claim 6, further comprising receiving one or more output data decryption update keys, wherein:
the one or more output data decryption update keys are configured to create one or more new output data decryption keys from the one or more output data decryption keys; and
the new output data decryption keys are configured to create the one or more plaintext output data from the one or more updated ciphertext output data.

8. The computer implemented method of claim 1, further comprising receiving one or more output data update decryption keys, wherein the output data update decryption keys are configured to create the one or more cipher output data from the one or more updated ciphertext output data.

9. The computer implemented method of claim 1, wherein the obfuscated and encrypted computed implemented method is performed on at least one of a linear space, a cyclic group, a polynomial ring, and a polynomial ring over a finite field.

10. The computer implemented method of claim 1, wherein the computer implemented method is performed by a plurality of processing units.

11. The computer implemented method of claim 1, wherein the computer implemented method is performed in a multiparty computation configuration.

12. The computer implemented method of claim 1, wherein at least one of the one or more program instruction encryption update keys expires based on at least one of number of uses, a time of use, and an erroneous authentication.

13. The computer implemented method of claim 1, wherein at least one of the one or more obfuscated and encrypted program instructions integrate at least one of a preprocess step or a postprocess step.

14. The computer implemented method of claim 1, wherein the computer implemented method is implemented on a client device.

15. The computer implemented method of claim 14, wherein the client device is at least one of a personal computer, a workstation, a laptop, a tablet, a smartphone, a smart watch, and an Internet-of-Things device.

16. A computing device comprising:
a memory; and
at least one processor configured to perform a method, the method comprising:
receiving one or more obfuscated and encrypted program instructions that implement an obfuscated and encrypted algorithm having fixed obfuscated and encrypted coefficients, wherein:
the one or more obfuscated and encrypted program instructions are configured for:
receiving one or more ciphertext input data;
providing one or more ciphertext output data; and implementing obfuscated and encrypted versions of one or more plaintext program instructions that implement a plaintext algorithm having fixed plaintext coefficients; wherein:
    the one or more plaintext program instructions are configured for:
        receiving one or more plaintext input data; and
        providing one or more plaintext output data;
    the one or more ciphertext input data is an encrypted version of the one or more plaintext input data; and
    the one or more ciphertext output data is an encrypted version of the one or more plaintext output data;
and
the one or more obfuscated and encrypted program instructions are an encrypted version of the one or more plaintext program instructions using one or more program instruction encryption keys;
receiving one or more program instruction encryption update keys, wherein:
    the one or more program instruction encryption update keys are configured for updating the one or more obfuscated and encrypted program instructions into one or more updated obfuscated and encrypted program instructions for updating and securing the plaintext algorithm, or obfuscated and encrypted algorithm;
    the one or more updated obfuscated and encrypted program instructions are configured for:
        receiving one or more updated ciphertext input data; and
        producing one or more updated ciphertext output data, wherein the one or more updated ciphertext input data is an encrypted version of the one or more plaintext input data;
    and
    the one or more updated ciphertext output data is an encrypted version of the one or more plaintext input data;
executing an update operation on the obfuscated and encrypted instructions using the one or more program instruction encryption update keys to create one or more updated obfuscated and encrypted instructions, wherein:
    the one or more updated obfuscated and encrypted instructions comprise fixed updated obfuscated and encrypted coefficients; and
    the fixed updated obfuscated and encrypted coefficients are configured for implementing an updated obfuscated and encrypted version of the plaintext algorithm;
and
storing the fixed updated obfuscated and encrypted coefficients.

17. A non-transitory computer-readable storage medium, the non-transitory computer-readable storage medium storing computer instructions to be implemented on at least one computing device including at least one processor, the computer instructions when executed by the at least one processor cause the at least one computing device to perform a method, the method comprising:
receiving one or more obfuscated and encrypted program instructions that implement an obfuscated and encrypted algorithm having fixed obfuscated and encrypted coefficients, wherein:
the one or more obfuscated and encrypted program instructions are configured for:
    receiving one or more ciphertext input data;
    providing one or more ciphertext output data; and
    implementing obfuscated and encrypted versions of one or more plaintext program instructions that implement a plaintext algorithm having fixed plaintext coefficients; wherein:
        the one or more plaintext program instructions are configured for:
            receiving one or more plaintext input data; and
            providing one or more plaintext output data;
        the one or more ciphertext input data is an encrypted version of the one or more plaintext input data; and
        the one or more ciphertext output data is an encrypted version of the one or more plaintext output data;
and
the one or more obfuscated and encrypted program instructions are an encrypted version of the one or more plaintext program instructions using one or more program instruction encryption keys;
receiving one or more program instruction encryption update keys, wherein:
the one or more program instruction encryption update keys are configured for updating the one or more obfuscated and encrypted program instructions into one or more updated obfuscated and encrypted program instructions for updating and securing the plaintext algorithm, or obfuscated and encrypted algorithm;
the one or more updated obfuscated and encrypted program instructions are configured for:
    receiving one or more updated ciphertext input data; and
    producing one or more updated ciphertext output data, wherein the one or more updated ciphertext input data is an encrypted version of the one or more plaintext input data;
and
the one or more updated ciphertext output data is an encrypted version of the one or more plaintext input data;
executing an update operation on the obfuscated and encrypted instructions using the one or more program instruction encryption update keys to create one or more updated obfuscated and encrypted instructions, wherein:
the one or more updated obfuscated and encrypted instructions comprise fixed updated obfuscated and encrypted coefficients; and
the fixed updated obfuscated and encrypted coefficients are configured for implementing an updated obfuscated and encrypted version of the plaintext algorithm;
and
storing the fixed updated obfuscated and encrypted coefficients.

\* \* \* \* \*